United States Patent
Ly et al.

(10) Patent No.: US 12,199,909 B2
(45) Date of Patent: Jan. 14, 2025

(54) INDICATION OF MESSAGE REPETITION AND DEMODULATION REFERENCE SIGNAL BUNDLING CAPABILITIES

(71) Applicant: QUALCOMM Incorporated, San Diego, CA (US)

(72) Inventors: Hung Dinh Ly, San Diego, CA (US); Mahmoud Taherzadeh Boroujeni, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 17/711,862

(22) Filed: Apr. 1, 2022

(65) Prior Publication Data

US 2022/0337368 A1     Oct. 20, 2022

Related U.S. Application Data

(60) Provisional application No. 63/176,831, filed on Apr. 19, 2021.

(51) Int. Cl.
*H04L 5/00* (2006.01)
*H04B 1/00* (2006.01)
(Continued)

(52) U.S. Cl.
CPC ......... *H04L 5/0051* (2013.01); *H04B 1/0064* (2013.01); *H04W 74/0833* (2013.01)

(58) Field of Classification Search
CPC ... H04L 5/0051; H04L 5/0007; H04L 5/0053; H04L 5/0092; H04L 1/1664;
(Continued)

(56) References Cited

U.S. PATENT DOCUMENTS

2020/0396744 A1    12/2020   Xiong et al.
2021/0360660 A1    11/2021   Cozzo et al.
(Continued)

FOREIGN PATENT DOCUMENTS

WO    WO-2022028374 A1    2/2022

OTHER PUBLICATIONS

International Search Report and Written Opinion—PCT/US2022/023352—ISA/EPO—Jun. 15, 2022.
(Continued)

*Primary Examiner* — Candal Elpenord
(74) *Attorney, Agent, or Firm* — Guang Y. Zhang; Loza & Loza LLP

(57) ABSTRACT

Aspects relate to wireless communication including the provision of the ability of a user equipment (UE) to indicate the capability of the UE for demodulation reference signal (DMRS) bundling and/or joint channel estimation (JCE). In aspects, the capability indication includes using at least a physical random access channel (PRACH) to indicate the capability of a UE for repeated transmission of the physical uplink shared channel (PUSCH) carrying a connection message, and counting of available slots that are used for the repeated transmission of the physical channel. Additionally, the UE may be configured to indicate the capability for JCE through a demodulation reference signal (DMRS) configuration or a DMRS port.

28 Claims, 15 Drawing Sheets

(51) Int. Cl.
*H04W 74/08* (2024.01)
*H04W 74/0833* (2024.01)

(58) Field of Classification Search
CPC ....... H04L 1/1816; H04L 1/1819; H04L 1/08; H04B 1/0064; H04W 74/0833; H04W 74/02; H04W 74/008; H04W 74/004
USPC .......................................................... 370/281
See application file for complete search history.

(56) References Cited

U.S. PATENT DOCUMENTS

| | | | |
|---|---|---|---|
| 2022/0210844 A1* | 6/2022 | MolavianJazi | ... H04W 74/0866 |
| 2022/0225322 A1* | 7/2022 | Shim | .......................... H04L 1/08 |
| 2022/0225360 A1* | 7/2022 | Yi | .......................... H04W 72/23 |
| 2023/0276369 A1* | 8/2023 | Fu | .......................... H04L 5/0051 370/329 |
| 2023/0345432 A1* | 10/2023 | Deng | .................... H04L 1/1864 |
| 2024/0073965 A1* | 2/2024 | Seok | .................... H04W 74/006 |
| 2024/0163011 A1* | 5/2024 | Hasegawa | ............. H04L 1/0071 |

OTHER PUBLICATIONS

Moderator (ZTE Corporation): "Feature Lead Summary on Support of Type A PUSCH Repetitions for Msg3", 3GPP Draft, 3GPP TSG RAN WG1 #104-e, R1-2102226, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 8, 2021 (Feb. 8, 2021), XP051977788, 77 Pages, Retrieved from the Internet: URL: https://ftp.3gpp.org/tsg_ran/WG1_RL1/TSGR1_104-e/Docs/R1-2102226.zip R1-2102226 Feature Lead Summary on Support of Type A PUSCH Repetitions for Msg3.docx [Retrieved on Feb. 8, 2021] p. 5, lines 17-28 Section 2.5, pp. 6-8 p. 27, line 26—p. 28, line 22.

NEC: "Discussion on PUSCH Repetitions for Msg3", 3GPP Draft, 3GPP TSG RAN WG1 #104-e, R1-2100944, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971283, 2 Pages, Retrieved from the Internet: URL: https://ftp.3gpp.org/tsg_ran/WG1_RL1/TSGR1_104-e/Docs/R1-2100944.zip R1-2100944 Discussion on PUSCH Repetitions for Msg3.docx [Retrieved on Jan. 19, 2021].

ZTE Corporation: "Discussion on Support of Type A PUSCH Repetitions for Msg3", 3GPP Draft, 3GPP TSG RAN WG1 #104-e, R1-2100099, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051970804, 8 Pages, Retrieved from the Internet: URL: https://ftp.3gpp.org/tsg_ran/WG1_RL1/TSGR1_104-e/Docs/R1-2100099.zip R1-2100099, Discussion on Support of Type A PUSCH Repetitions for Msg3.docx [Retrieved on Jan. 19, 2021] Section 5, Section 6.

* cited by examiner

INDICATION OF MESSAGE REPETITION AND DEMODULATION REFERENCE SIGNAL BUNDLING CAPABILITIES

CROSS REFERENCE TO RELATED APPLICATIONS

This application claims priority to and the benefit of U.S. Provisional Application No. 63/176,831 filed in the U.S. Patent and Trademark Office on Apr. 19, 2021, the entire contents of which are incorporated herein by reference as if fully set forth below in its entirety and for all applicable purposes.

TECHNICAL FIELD

The technology discussed below relates generally to wireless communication and, more particularly, to indication by a user equipment (UE) of capabilities for repetition of physical uplink shared channel (PUSCH) messages and demodulation reference signal (DMRS) bundling or joint channel estimation (JCE) for channel estimation.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a cell via a network node or entity, which may be implemented by a base station or gNodeB (gNB), for example.

In 5G NR-RAN systems, for example, when a UE first connects to the NR-RAN, an initial access process is performed. In particular, a random access channel (RACH) process is performed that consists of three or four messages transmitted between the UE and a network entity such as a gNode-B (gNB) depending on whether or not the initial access is contention-free (three messages) or contention-based (four messages). The third sequential message of these messages is termed "Message 3: or "Msg3" and is physically transmitted from the UE to the gNB using the physical uplink shared channel (PUSCH) and may include a radio resource control (RRC) connection request. In 5G NR systems, repeat transmission of the Msg3 (also termed Msg3 repetition or PUSCH repetition) has been introduced to extend the coverage for Msg3 transmissions.

Furthermore, when multiple repeat transmissions of the Msg3 in the PUSCH are sent, a receiver of those messages will process the demodulation reference signals (DMRSs) in the multiple PUSCH transmissions for joint channel estimation (JCE) in order to properly demodulate and decode the received signals. In such case, the transmitter of the repeat Msg3 transmissions is typically constrained to maintain phase continuity across the multiple PUSCH transmission, such as maintaining the same frequency resource allocation, the same transmit power, and/or the same spatial transmission relation, antenna ports, and precoding across all of the repeat PUSCH transmissions. The ability for JCE across the repeat PUSCH transmissions for Msg3 provides additional gain beyond just PUSCH repetition. Provision of JCE across multiple Msg3 transmissions is likely subject to the capability of the UE; in particular the capability to maintain phase continuity across multiple PUSCH transmissions.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to a first example, a user equipment (UE) is disclosed that includes a transceiver, a memory, and a processor communicatively coupled to the transceiver and the memory. The processor is configured to configure a physical random access channel (PRACH) resource according to a predetermined configuration to indicate that the UE is capable of supporting: (1) repeated transmission of a physical channel carrying a connection message, and (2) counting of available slots that are used for the repeated transmission of the physical channel. Additionally, the processor is configured to transmit a PRACH using the configured PRACH resource to a network entity.

In other examples, a method for wireless communication in a user equipment (UE) is disclosed. The method includes configuring a physical random access channel (PRACH) resource according to a predetermined configuration to provide a capability indication to indicate that the UE is capable of supporting both repeated transmission of a physical channel carrying a connection message, and counting of available slots that are used for the repeated transmission of the physical channel. The method further includes transmitting a PRACH using the configured PRACH resource to a network entity.

In yet further examples, a base station or network entity is disclosed including a transceiver, a memory, and a processor communicatively coupled to the transceiver and the memory. The processor is configured to process a physical random access channel (PRACH) using a PRACH resource received from a user equipment (UE) where the PRACH resource is configured according to a predetermined configuration to provide a capability indication that indicates that the UE is capable of supporting: (1) repeated transmission of a physical channel carrying a connection message, and (2) counting of available slots that are used for the repeated transmission of the physical channel. The processor is further configured to decode the PRACH to determine the capability indication, wherein the PRACH resource comprises a PRACH preamble or a PRACH occasion comprising time and frequency resources and the connection message comprises a message 3 (Msg3) message including one or more of a radio resource connection request, a scheduling request, or a buffer status.

According to yet another example, a method for wireless communications in a base station is disclosed. The method includes receiving a physical random access channel (PRACH) using a PRACH resource from a user equipment (UE) where the PRACH resource is configured according to a predetermined configuration to provide a capability indication that indicates that the UE is capable of supporting: (1) repeated transmission of a physical channel carrying a connection message, and (2) counting of available slots that are used for the repeated transmission of the physical channel. The method further includes decoding the PRACH to determine the capability indication, wherein the PRACH resource comprises a PRACH preamble or a PRACH occasion comprising time and frequency resources and the connection message comprises a message 3 (Msg3) message including one or more of a radio resource connection request, a scheduling request, or a buffer status. Aspect 2:

The method of aspect 1, wherein the PRACH resource comprises a PRACH preamble or a PRACH occasion comprising time and frequency resources.

These and other aspects of the disclosure will become more fully understood upon a review of the detailed description, which follows. Other aspects, features, and examples of the present disclosure will become apparent to those of ordinary skill in the art, upon reviewing the following description of specific, example examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example examples may be discussed below as device, system, or method examples it should be understood that such example examples can be implemented in various devices, systems, and methods.

DETAILED DESCRIPTION

Figure 1:
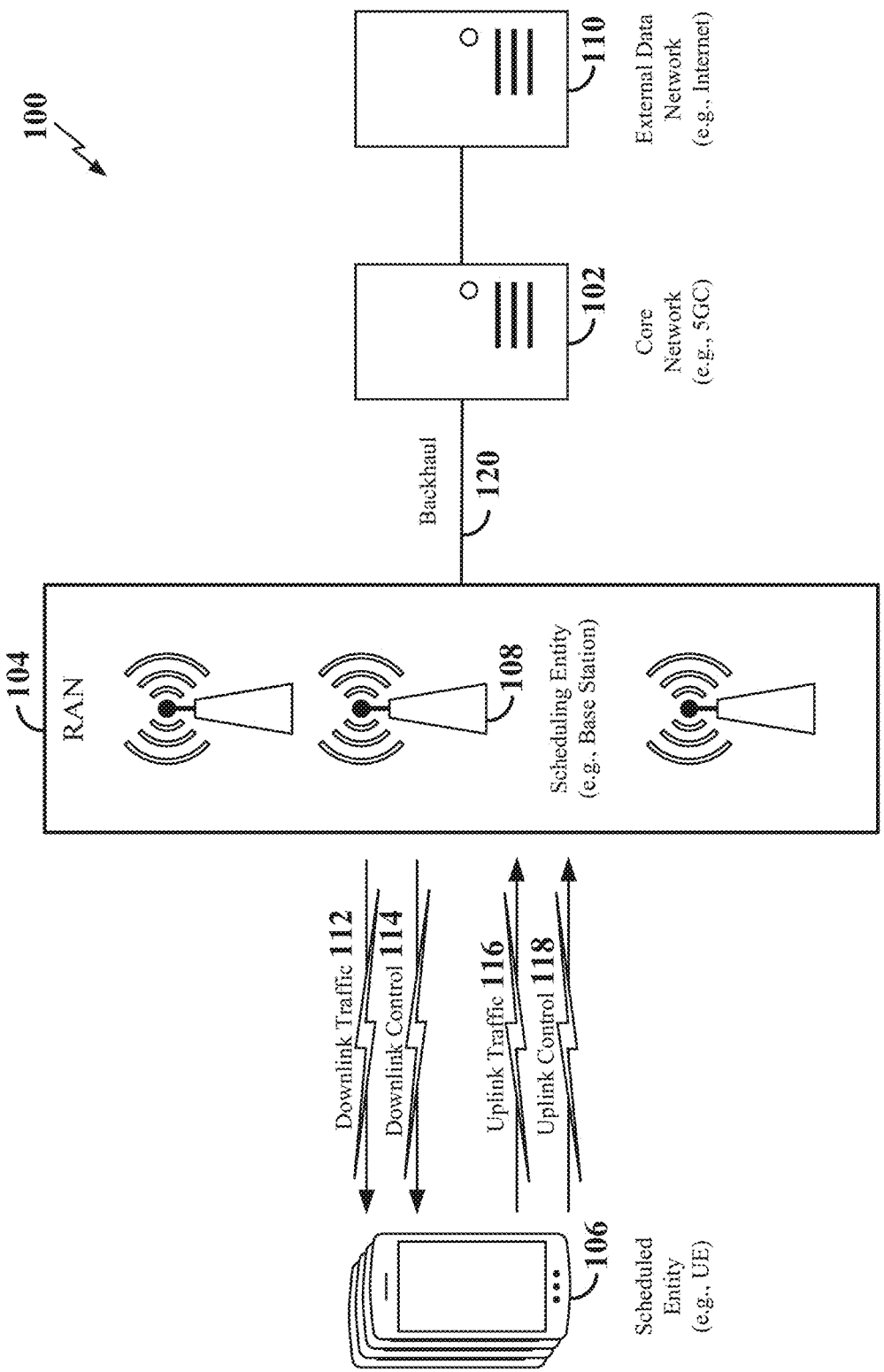
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

According to some aspects of this application, an indication of a UE capability for maintaining phase continuity across multiple PUSCH Msg3 repetitions is disclosed. In some examples, the UE is configured for providing an indication that the UE has the ability to count slots for PUSCH Msg3 repetition, and supports DMRS bundling and/or joint channel estimation (JCE). A UE so enabled may provide indication to the network (e.g., a gNB) that the UE has these capabilities such that the network will know that UE may implement PUSCH Msg3 repetitions.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, examples and/or uses may come about via integrated chip examples and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below, e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
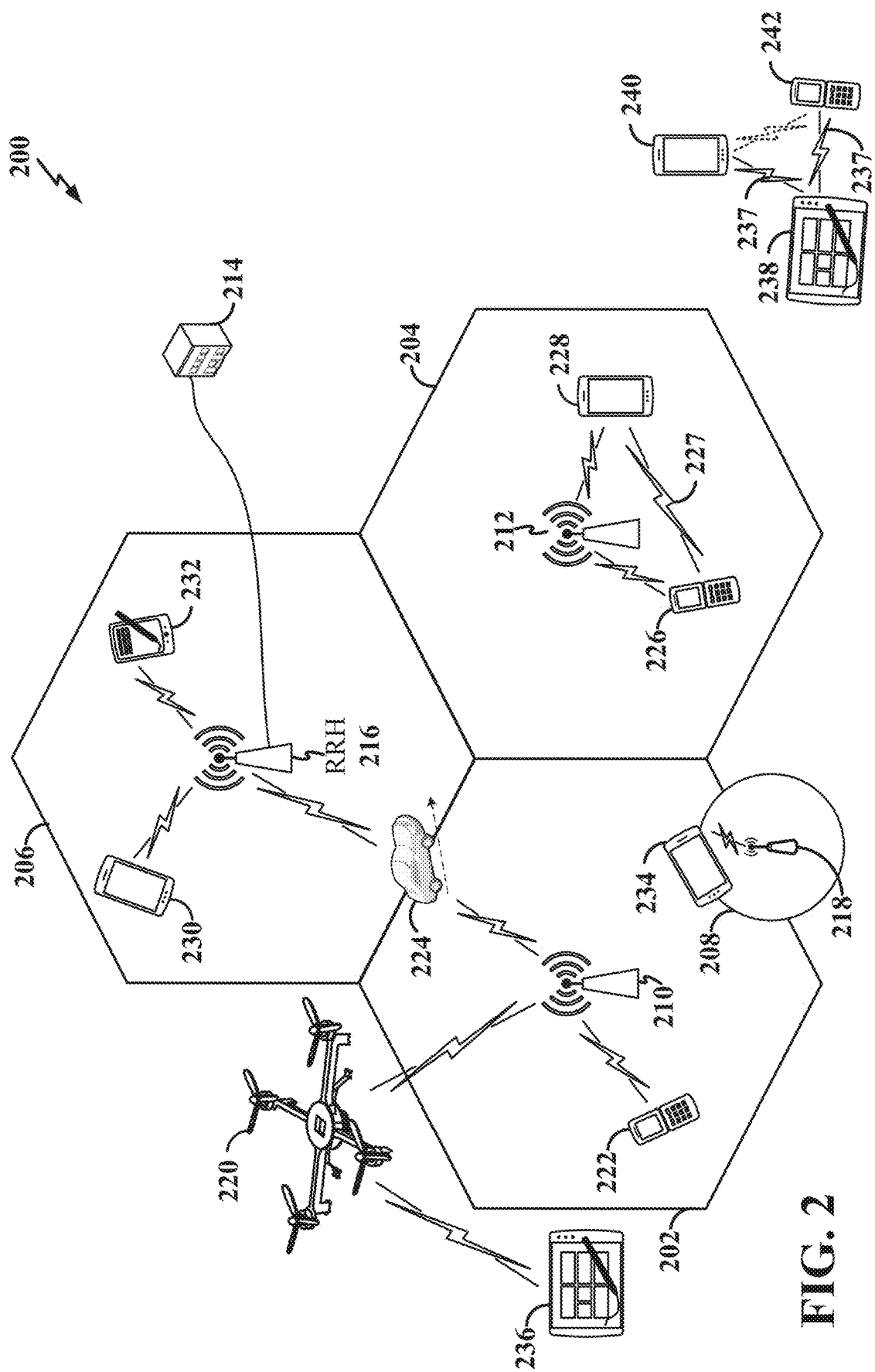
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, gNodeB, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, and/or 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), OFDM, sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals 237 may be used between UEs without necessarily relying on scheduling or control information from a base station. For example, two or more UEs (e.g., UEs 226 and 228 (or UEs 240 and 242)) may communicate with each other using peer to peer (P2P) or sidelink signals 227 (or 244) without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 (or 244) include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
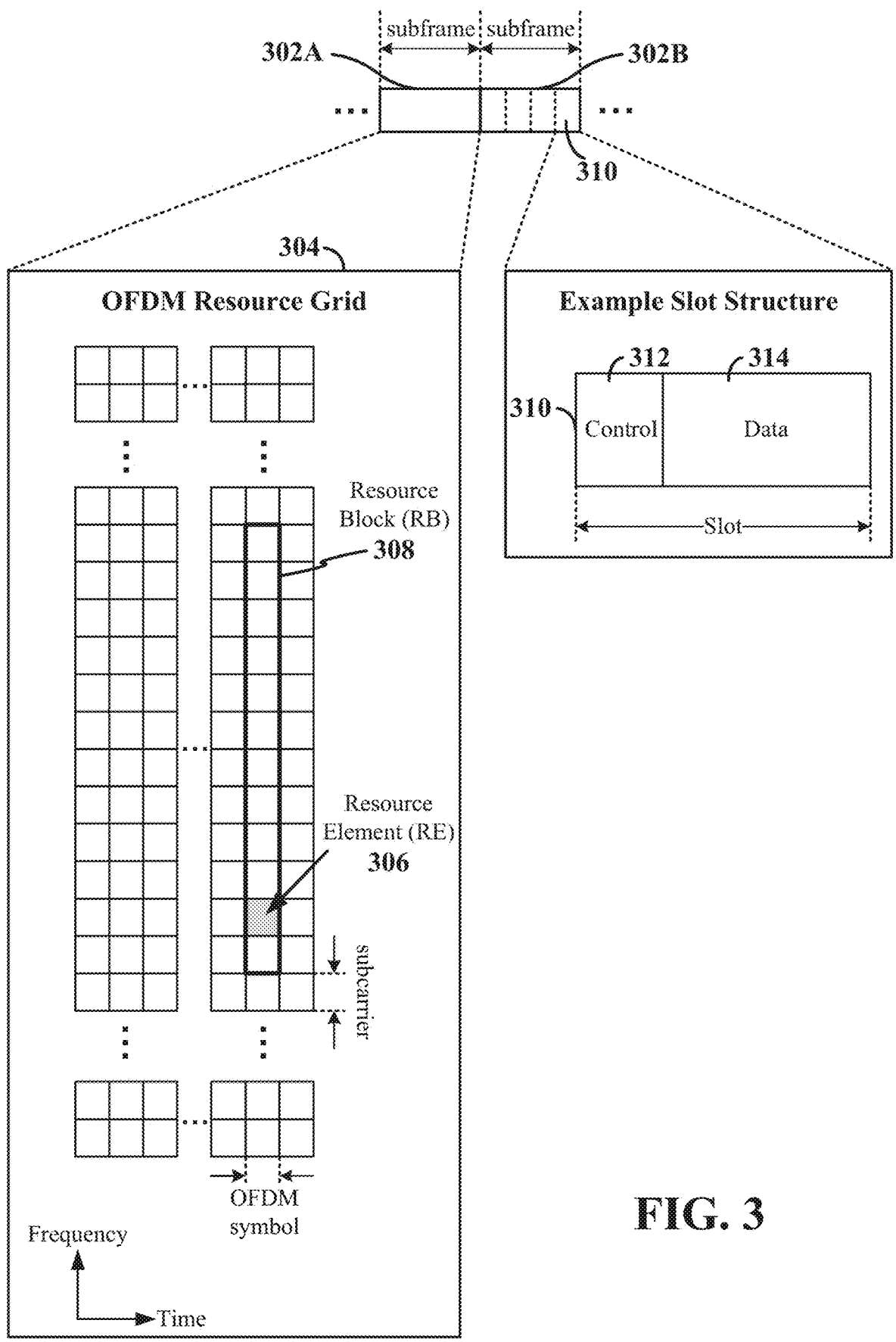
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., physical downlink shared channel (PDSCH) or physical uplink shared channel (PUSCH)). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a physical broadcast channel (PBCH), and/or a PDCCH, etc., to one or more scheduled entities. The transmitting device may further allocate one or more REs 306 to carry other DL signals, such as a DMRS, a phase-tracking reference signal (PT-RS), a channel state information-reference signal (CSI-RS), a primary synchronization signal (PSS), and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals, may include one or more supplemental channels in addition to the PBCH, may omit a PBCH, and/or may utilize a different number of symbols and/or nonconsecutive symbols for an SSB, within the scope of the present disclosure.

The SSB may be used to send system information (SI) and/or provide a reference to SI transmitted via another channel Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random-access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The physical (PHY) channel carries Hybrid Automatic Repeat Request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission, a PUSCH. In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
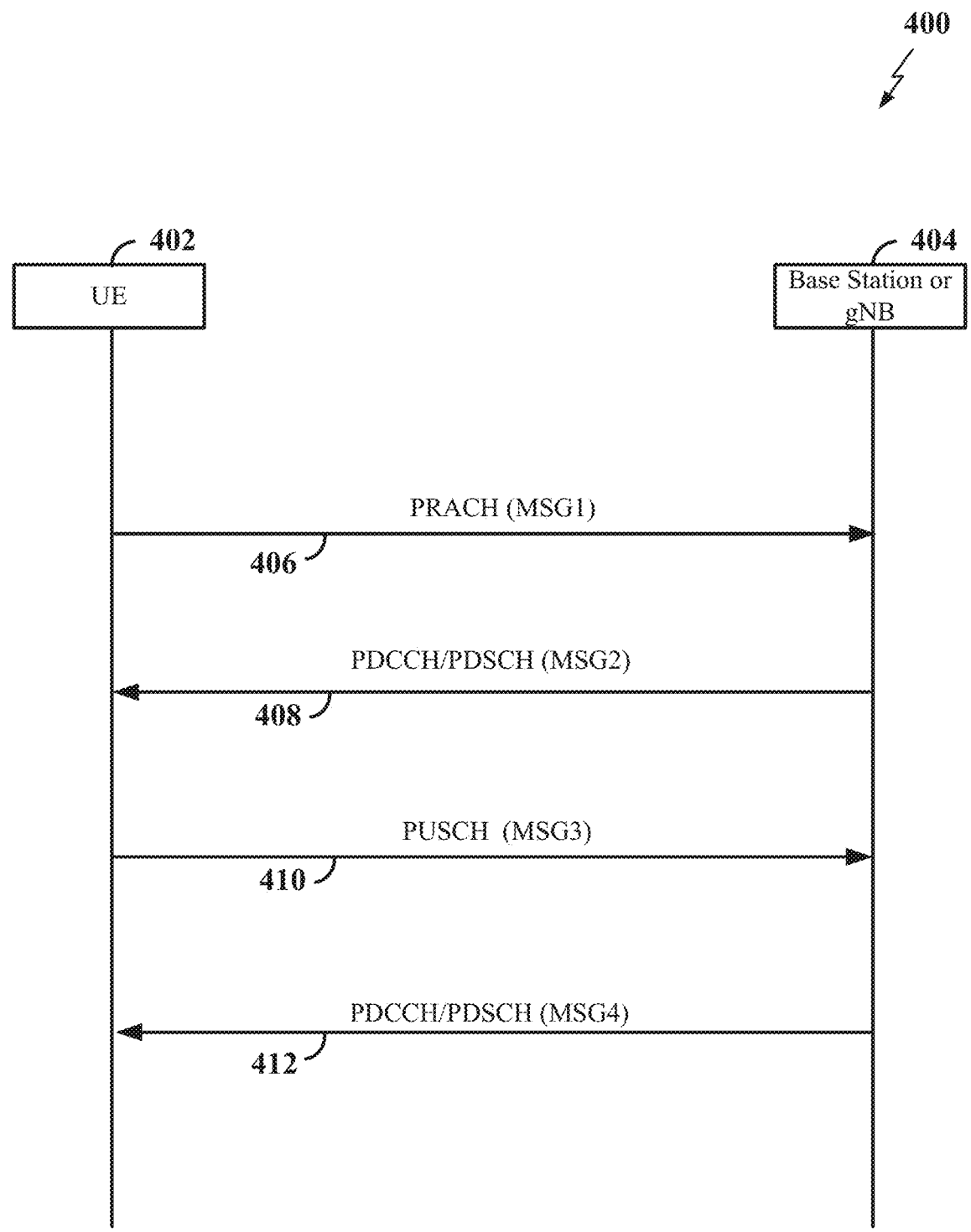
FIG. 4 illustrates a call flow diagram 400 showing an example of a four step RACH procedure according to some aspects.

As discussed before, when a UE connects to a network, such as the UE 106 connecting to RAN 104, a RACH procedure is implemented. FIG. 4 illustrates a call flow diagram 400 showing an example of a four step RACH procedure that is contention-based for this example. As shown, the RACH procedure involves messages transmitted between a UE 402 and a network entity such as a base station or gNB 404. The first message Msg1 406 is sent via a physical random access channel (PRACH), which serves to carry a PRACH preamble that may be one of a number of different available preamble configurations (e.g., 64 configurations for 5G NR).

In response to Msg1 406, the base station or gNB 404 responds to the PRACH preamble by generating and sending a second message Msg2 408 via the PDCCH or PDSCH channels. The Msg2 408 is a random access response (RAR) in response to Msg1 406 and may include a timing advance, an uplink (UL) grant for subsequent message 3 (Msg3), a temporary cell-radio network temporary identifier (TC-RNTI), among other things.

In response to Msg2 408, the UE responds by sending a third message; i.e., Msg 3 410 over the PUSCH. Msg3 410 generally is a connection request and, in particular, includes an RRC connection request, a scheduling request, and the buffer status of the UE, among other things. As discussed before, for coverage enhancement in 5G NR systems, Msg3 is repeated by transmission over the PUSCH. Moreover, for Msg3 repetition systems, the UE transmitter maintains phase continuity across the multiple PUSCH repetition transmissions.

Finally, for a contention-based RACH procedure, the base station or gNB 406 transmits a fourth message Msg4 412 over the PDCCH or PDSCH resources. Msg4 includes a contention resolution message. This message, for example, may assist the UE in contention resolution using the TC-RNTI (or cell RNTI (C-RNTI)) on the PDCCH or using the UE Contention Resolution Identity IE on the PDSCH to determine if contention resolution is successful.

In some scenarios, the Msg3 may be bottlenecked where the Msg3 does not get received at the base station or gNB and multiple retransmissions of the Msg3 may be required to successfully deliver the Msg3 to the base station or gNB. It is noted that in such scenarios, a UE needs to successfully receive both the RAR (e.g., Msg2) for initial transmission and the TC-RNTI DCI for retransmission, which leads to high PDCCH overhead. Additionally, retransmission of Msg3 increases the initial access latency of the RACH procedure.

Accordingly, Msg3 PUSCH repetition may be introduced for extending Msg3 coverage. In some cases, Msg3 repetition may be enabled only for when retransmission is needed, but could also be enabled for both repetition of the Msg3 for the initial transmission and the retransmission in some examples. It is noted here that Msg3 repetition is distinguished from retransmission in that repetition of the message is a configured scheme to repeat transmission of the same Msg3 some predetermined number of times as a matter of course (e.g., a configuration to send multiple transmissions of Msg3 after the Msg2 that is not technically a retransmission process where DCI with C-RNTI or TC-RNTI has to be received and decoded before retransmission of the Msg3).

Figure 5:
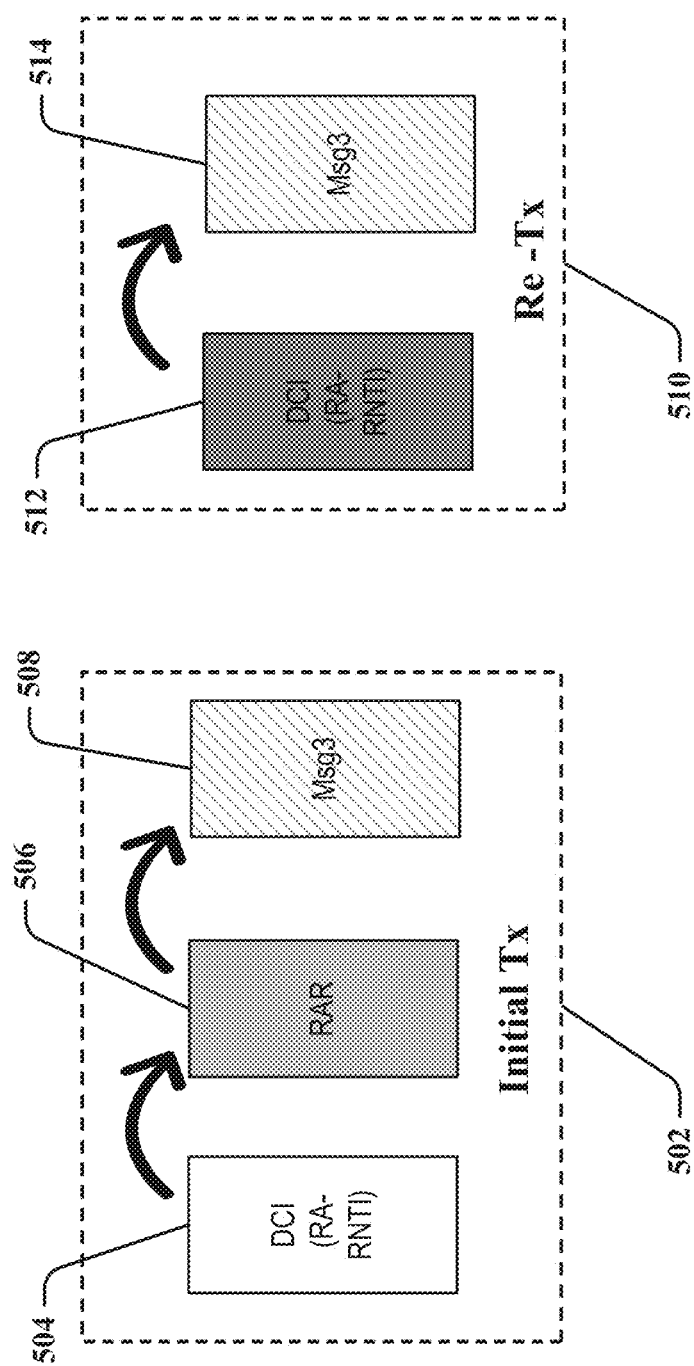
FIG. 5 is a time sequence diagram illustrating an example of signaling during initial transmit and re-transmit occasions according to some aspects.

FIG. 5 illustrates an example of the sequence of messaging for initial transmission of the Msg3 and/or for retransmission of the Msg3. Block 502 illustrates an initial transmit sequence, with transmission of DCI with a random access radio network temporary identifier (RA-RNTI) 504 from a gNB to a UE wherein the gNB scrambles the CRC of the PDCCH with the RA-RNTI for transmission of PDSCH that carries the RAR (e.g., Msg 2) 506 from the gNB to the UE. Further, in response to the RAR 506, the UE transmits the Msg3 508 to the gNB via the PUSCH. In a retransmission situation shown at block 510 (i.e., after the initial transmit process of block 502), the UE receives DCI with TC-RNTI from the gNB as shown at 512, which is transmitted via PDCCH resources in one example. The UE then retransmits the Msg3 as shown by block 514.

Figure 6:
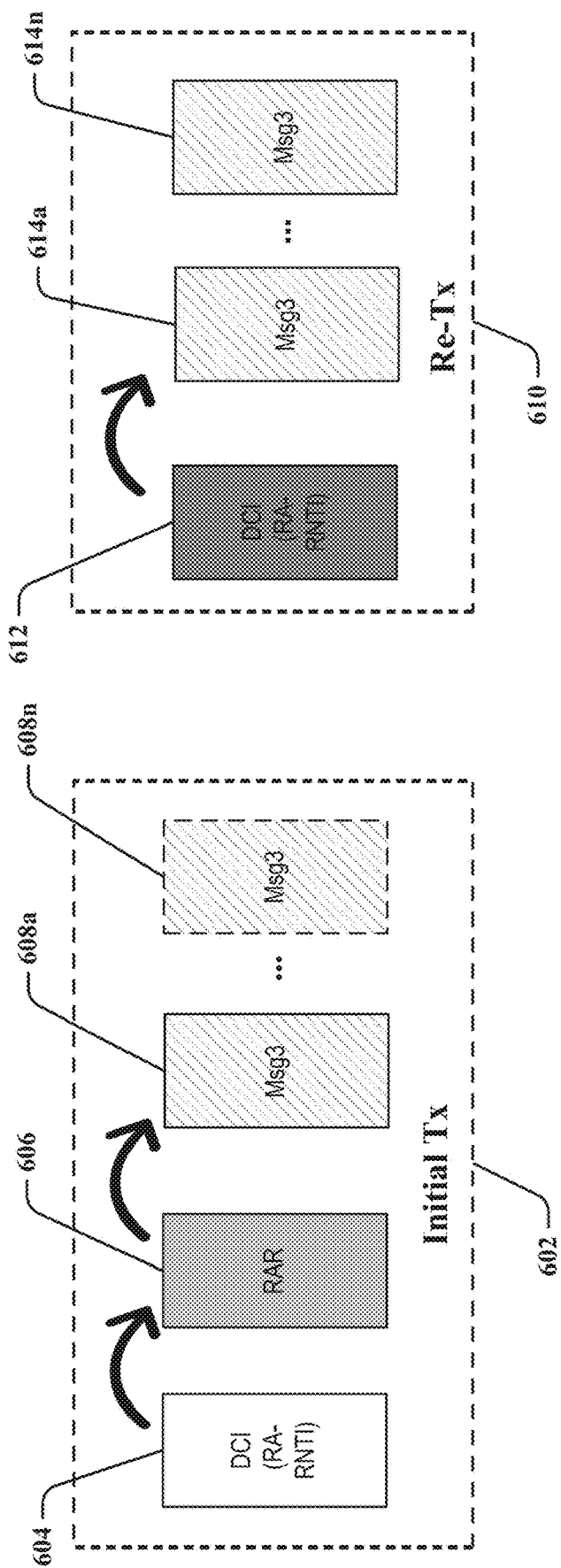
FIG. 6 illustrates an example of the time sequence diagram for RACH procedures utilizing repeated or repetition transmissions of Msg3 for enhanced coverage for Msg3 transmission according to some aspects.

FIG. 6 illustrates an example of the time sequence for RACH procedure utilizing repeated or repetition transmissions of Msg3 for enhanced coverage for Msg3 transmission. In this scenario, block 602 illustrates an initial transmit sequence, with transmission of DCI with RA-RNTI 604 from a UE to a gNB and the subsequent transmission of the RAR (e.g., Msg 2) 5606 from the gNB to the UE. In some examples, the initial transmit process in block 602 may utilize Msg3 repetition, and thus, multiple or repeat Msg3 transmissions of a same configuration are illustrated by reference numbers 608a through 608n. In a retransmission situation shown at block 610 (i.e., after the initial transmit process of block 602), the UE receives DCI with TC-RNTI from the gNB as shown at 612, which is transmitted via PDCCH resources in one example. The UE then retransmits the Msg3 as shown by block 614a. In this example, however, Msg3 repetition is also utilized and, therefore, multiple or repeat Msg3 transmissions are illustrated as shown by blocks 614a through 614n.

Of further note, it is known that PUSCH repetition is classified into at least two types: Type A and Type B. In Type A, the same symbol allocation for a slot is applied across the repeated PUSCH transmissions. In Type B different symbol allocation in slots may be applied across repeated PUSCH transmissions.

Figure 7:
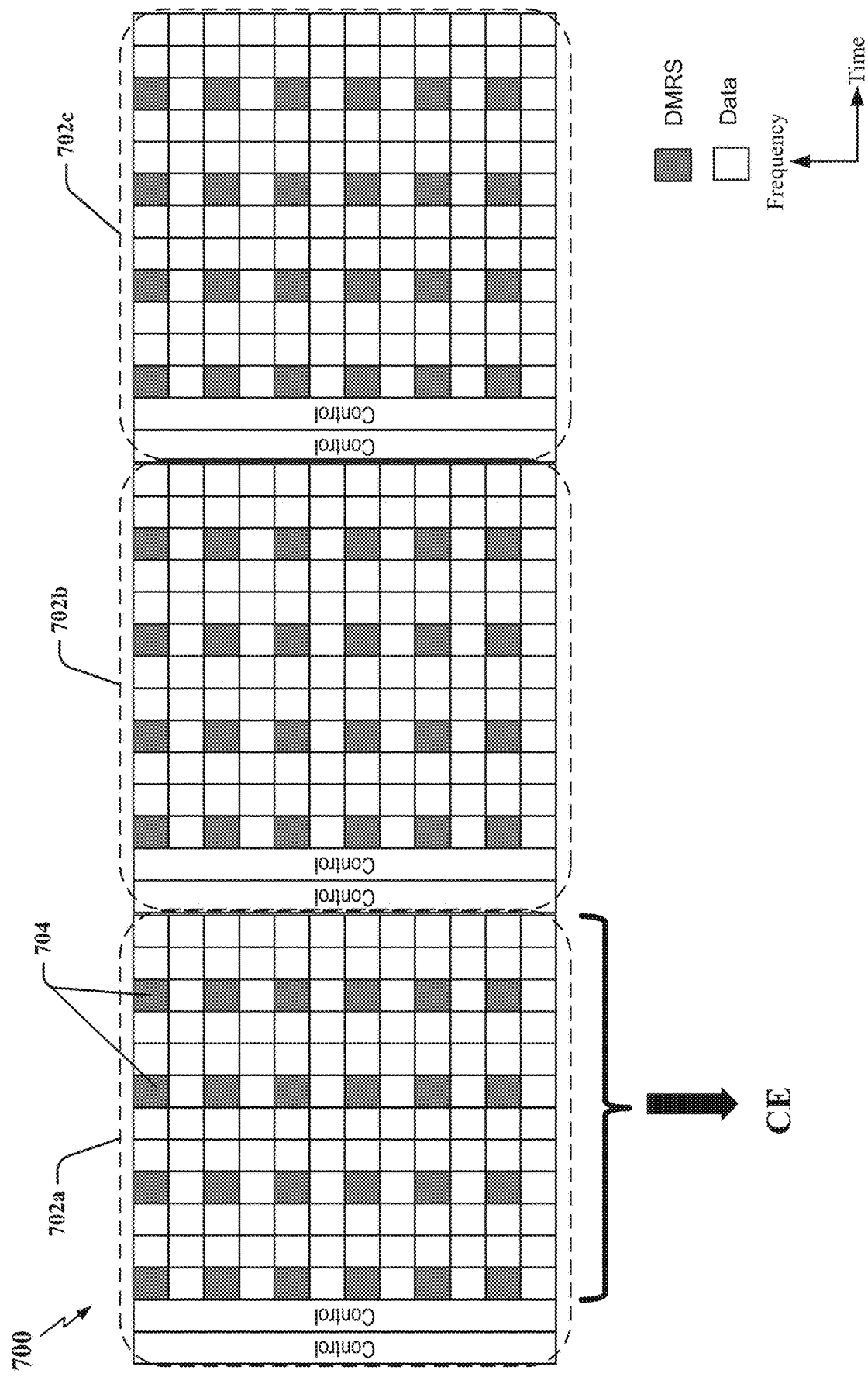
FIG. 7 illustrates an example of PUSCH transmission slots having demodulation reference signals (DMRSs) used in channel estimation (CE) where DMRSs are used for CE in each respective slot according to some aspects.

Another aspect to be considered in Msg3 PUSCH repetition is that of joint channel estimation. In 5G NR DMRSs are used for channel estimation at a receiver receiving a signal having the DMRS resources within the signal. For example, FIG. 7 illustrates a conventional process for channel estimation (CE) where a number of slots 702a, 702b, and 702c are transmitted sequentially in time. Each slot contains a number of symbols (e.g., 14 symbols with two control symbols and 12 symbols with data and/or DMRS). In the example of FIG. 7, a receiver may utilize the DMRS 704 in the slot 702a to perform channel estimation for decoding the slots 702a, 702b, 702c.

Figure 8:
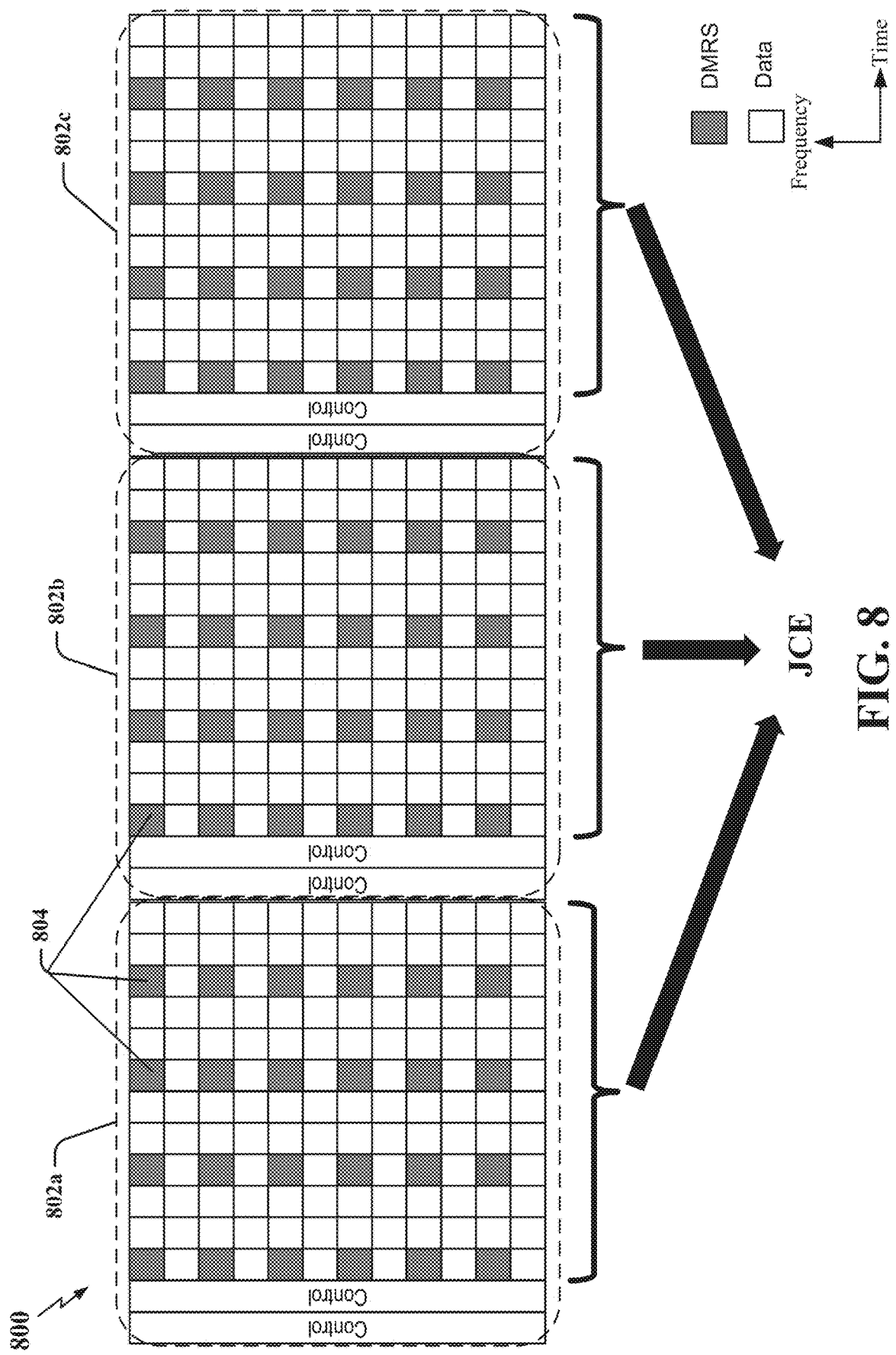
FIG. 8 illustrates slots having demodulation reference signals (DMRSs) used in channel estimation (CE) where DMRSs from multiple slots are bundled for joint CE in according to some aspects.

In joint channel estimation (JCE), however, an iterative type channel estimation is utilized by using an aggregate of the DMRS tones over a number of slots in time such as slots 702a, 702b, and 702c for channel estimation. As an illustration, FIG. 8 shows that DMRS tones 804 from each of a number of slots 802a, 802b, and 802c are jointly utilized for channel estimation. The receiver of the slots jointly processes the DMRSs from multiple PUSCH repetition transmissions, for example. This joint channel estimation technique becomes particularly useful in systems using mmWave and massive MIMO.

The process of JCE may also be referred to or thought of as bundling of DMRSs in the time domain across one or more time slots (i.e., time domain bundling of DMRSs). When DMRS bundling is configured, the receiver (whether in a UE or base station) may perform joint channel estimation based on DMRS(s) received across the multiple slots 802a, 802b, 802c, as opposed to performing channel estimation separately for each individual slot based on the DMRSs received in that slot, such as was shown by FIG. 7.

When using DMRS bundling with Msg3 PUSCH repetition, in particular, it is important that the transmitter (i.e., the UE transmitter) maintains phase continuity across the multiple repeat PUSCH transmissions. Phase continuity may be maintained through a number of means including one or more of maintaining the same frequency resource allocation across the repeat transmissions, which was illustrated in FIG. 8 where each slot 802a, 802b, and 802c utilize the same time/frequency resources for data and DMRS. Other means for maintaining phase continuity include using the same transmit power at the transmitter, the same spatial transmission relationship, same antenna port, and same precoding.

Furthermore, in the example of UE transmission on the uplink (UL), and PUSCH repetition transmission specifically, the UE may be configured to count the number of UL slots available in a time division duplex (TDD) allocation (e.g., either a set or dynamic UL/DL slot allocation) with a combination of downlink, special (or flexible), and uplink slots over some set number or pattern of slots in an allocation (e.g., 16 slots for a TDD allocation). The capability of a UE to count or keep track of the UL slots becomes important for maintaining the phase continuity across multiple repeat PUSCH transmissions. In further aspects, when using PUSCH repetition type A, as discussed above, the UE is configured to repeat a transport block (TB) across consecutive slots applying the same symbol allocation in each slot. It is noted also that while FIG. 8 illustrates consecutive slots in time, there may be instances where the TDD allocation, for example, will have gaps between the uplink slots, such as downlink slots or special slots between the uplink slots in time. In these cases, the UE will nonetheless account for the number of UL slots for PUSCH repeat transmissions as will be explained below.

Figure 9A:
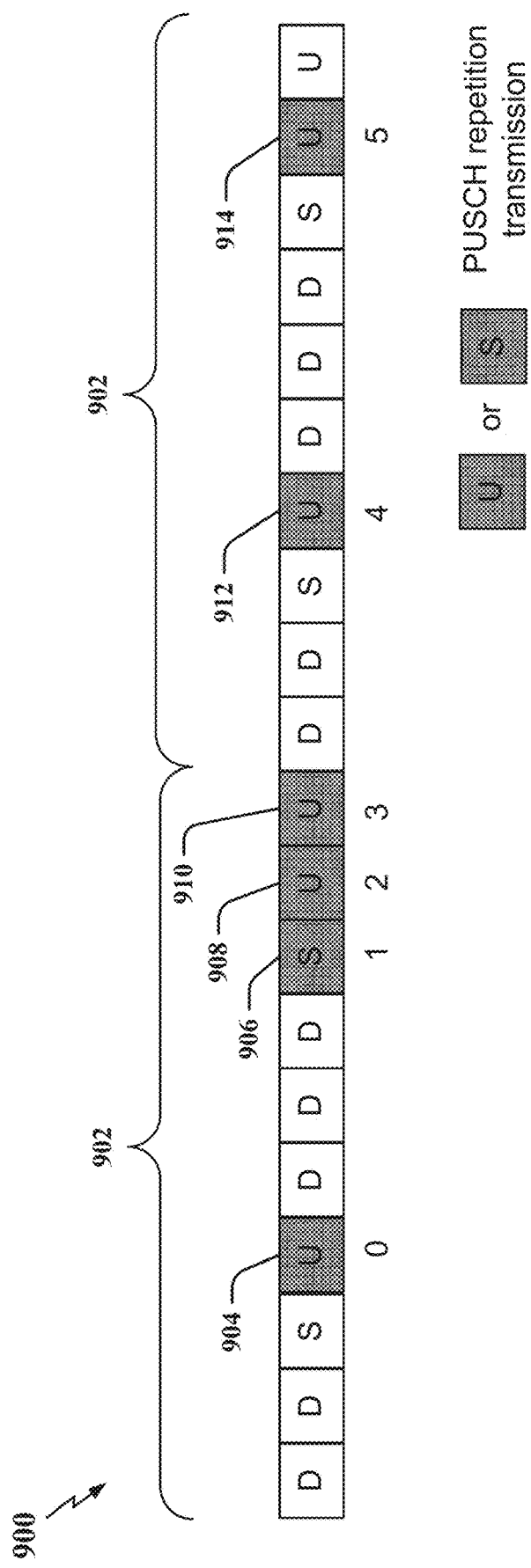
FIG. 9A illustrates an example of counting PUSCH repetition transmissions in a time division duplex (TDD) system according to some aspects.

FIG. 9A illustrates an example 900 of counting PUSCH repetition transmissions in a time division duplex (TDD) system. In this example, there are a number of either uplink (U), downlink (D), or special (S) slots allocated according to some allocation pattern. It is noted that the special (S) slots may be allocated as one of uplink, downlink, or flexible slots. The particular example of FIG. 9A shows a repeating pattern of 10 slots shown by brackets 902, but the present disclosure is applicable to many various patterns and allocations.

Further shown in FIG. 9A is an example of a count of the PUSCH repetition transmissions. Each of the PUSCH repetition transmissions may be seen at slots 904, 906 908, 910, and 912. It is noted that slot 906 in this example is a special slot S that is allocated for UL transmission. As shown below each of these slots in FIG. 9A, a representation of a count (starting from a slot 0) is illustrated representing the count that is kept in the UE of each PUSCH repetition transmission. The count, rather than counting all slots sequentially, is only counting the UL slots available for the PUSCH repetition transmission. In further aspects, the PUSCH repetition type may be Type A and the UE will repeat a same transport block (TB) across consecutive slots applying the same symbol allocation in each slot.

Figure 9B:
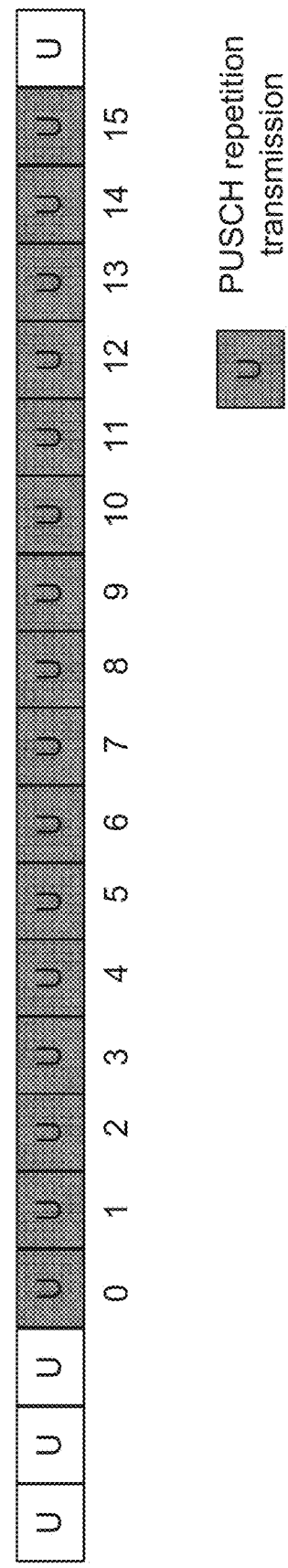
FIG. 9B illustrates an example of counting PUSCH repetition transmissions for a frequency division duplex (FDD) system according to some aspects.

FIG. 9B illustrates another example 920 of slot allocation for a frequency division duplex (FDD) system. In this case, each slot in time may be used for uplink transmissions as the frequency resources are allocated/duplexed instead of the time resources. Accordingly, a UE transmitting a PUSCH repetition transmission may simply count each slot as shown by count 0 through 15 below each uplink slot for this particular example, but not limited to such.

It is noted that the support of Msg3 PUSCH repetition and, further, the use of joint channel estimation across Msg3 PUSCH repetitions will be dependent on the capability of the UE capability, especially since the UE is required to maintain phase continuity across transmissions. Accordingly, affording a UE the ability to indicate the capability of the UE to support repetition counting of available slots and, accordingly, joint channel estimation/DMRS bundling across Msg3 PUSCH repetition would be desirable. In light of foregoing, the present disclosure provides various configurations of a UE to be able to send an indication to the network (e.g., gNB) of the capability for supporting Msg3 PUSCH repetition including the capability for counting available UL slots and joint channel estimation or DMRS bundling.

In a first option, a UE may configure and send a PRACH using a PRACH resource, such as the PRACH preamble or, alternatively, a PRACH occasion (i.e., time/frequency resources over which the PRACH is transmitted), that indicates support of Msg3 PUSCH repetitions. In particular, signaling on the PRACH resource will indicate to the network that UE supports Msg3 PUSCH repetition and repetition counting on available slots for PUSCH repetition. Further, the signaling may include indication of DMRS bundling or joint channel estimation capability where the transmitter in the UE is capable of maintaining phase continuity across multiple Msg3 PUSCH repetition transmissions.

Figure 10:
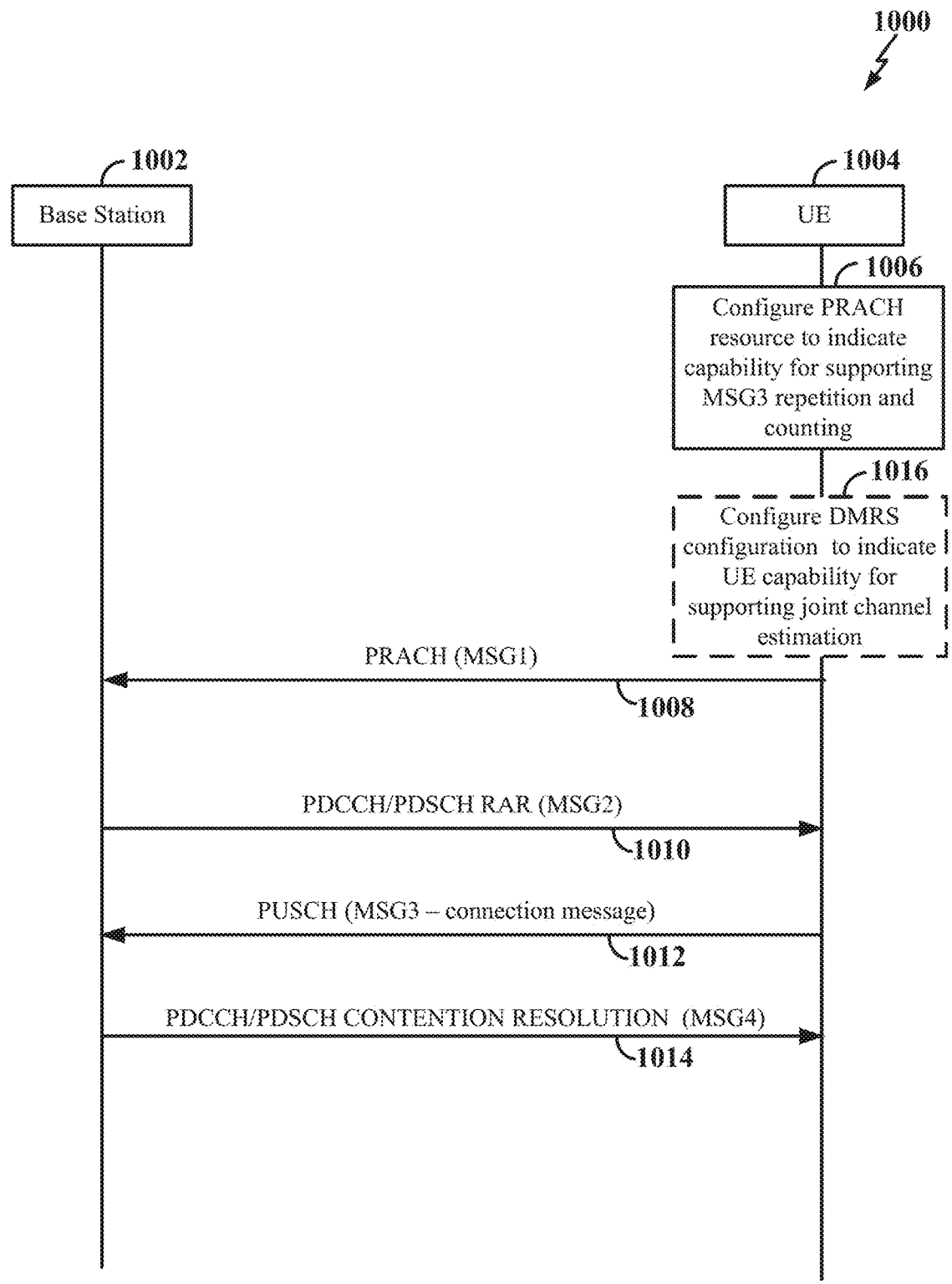
FIG. 10 illustrates a call flow diagram illustrating a UE indicating capabilities to a base station according to some aspects.

FIG. 10 illustrates a call flow diagram 1000 illustrating the first option described above. As shown, the signaling illustrated in call flow diagram 1000 is between a base station or gNB 1002 and a UE 1004. The flow or process may include configuring a PRACH resource (e.g., a PRACH preamble or PRACH occasion) as shown in block 1006. In some aspects, the process of block 1006 may include configuring the PRACH resource according to a predetermined configuration to indicate that the UE 1004 is capable of supporting repeated transmission of a physical channel carrying a connection message (e.g., the Msg3 PUSCH repetition), as well as being capable of counting of available slots that are used for repeated transmission of the physical channel.

In further aspects, the PRACH resource may be further configured to provide an indication that the UE 1004 is capable of joint channel estimation (JCE) and/or DMRS bundling. In a particular aspect, the indication may communicate to the base station that the UE is capable of maintaining phase continuity across repetitions of the Msg3 PUSCH transmissions. In some other aspects, it is noted that configuration of the PRACH resource in block 1006 may include selecting a set of PRACH resources, wherein the use of a particular selected set of PRACH resources is configured to provide the indication to the base station 1002 that the UE 1004 is configured for repetition of transmission of a physical channel carrying a connection message, and counting of available slots that may be used for transmission of the channel. In yet some further aspects, the ability of the UE 1004 to implement the processes in block 1006 may be configured by RRC signaling (not shown) from the network or, in an alternative, the UE 1004 may be pre-configured to implement the processes in block 1006.

After the PRACH resource is configured in block 1006, the UE 1004 transmits a PRACH 1008 using the configured PRACH resource to the base station or gNB 1002. At the base station 1002, the configured PRACH resource is decoded, which in turn communicates the capability indication to the base station 1002. Accordingly, the base station will be aware that the UE 1004 is able to send Msg3 PUSCH repetition and is also capable of counting available UL slots for Msg3 PUSCH repetition.

Similar to the process discussed in connection with FIG. 4, the base station 1002 will send the RAR message (Msg2) 1010 on the PDCCH or PDSCH. In response, the UE 1004 will transmit a connection message (i.e., Msg3 on the PUSCH) to the base station 1002. In particular, if the UE 1004 has the capability for Msg3 PUSCH repetition, then repeated transmission of the Msg3 will be performed, including transmission. Finally, in the case of a contention-based RACH procedure, the base station 1002 will send Msg 4 for contention resolution via PDCCH or PDSCH resources as shown at 1014.

In a second option, rather than configuring a single PRACH for indicating support of Msg3 repetitions, different capabilities related to Msg3 repetitions may be communicated via two or more separate PRACHs. In an example, a first capability may be sent using a first PRACH resource (PRACH resource 1) and a second capability sent using a second PRACH resource. Further, the UE may be configured to send a PRACH for indicating support of Msg3 repetitions via the first PRACH including indication that the UE supports repetition and repetition counting on available slots. The second capability; namely that the UE supports DMRS bundling/JCE, may be sent via the second PRACH resource.

Figure 11:
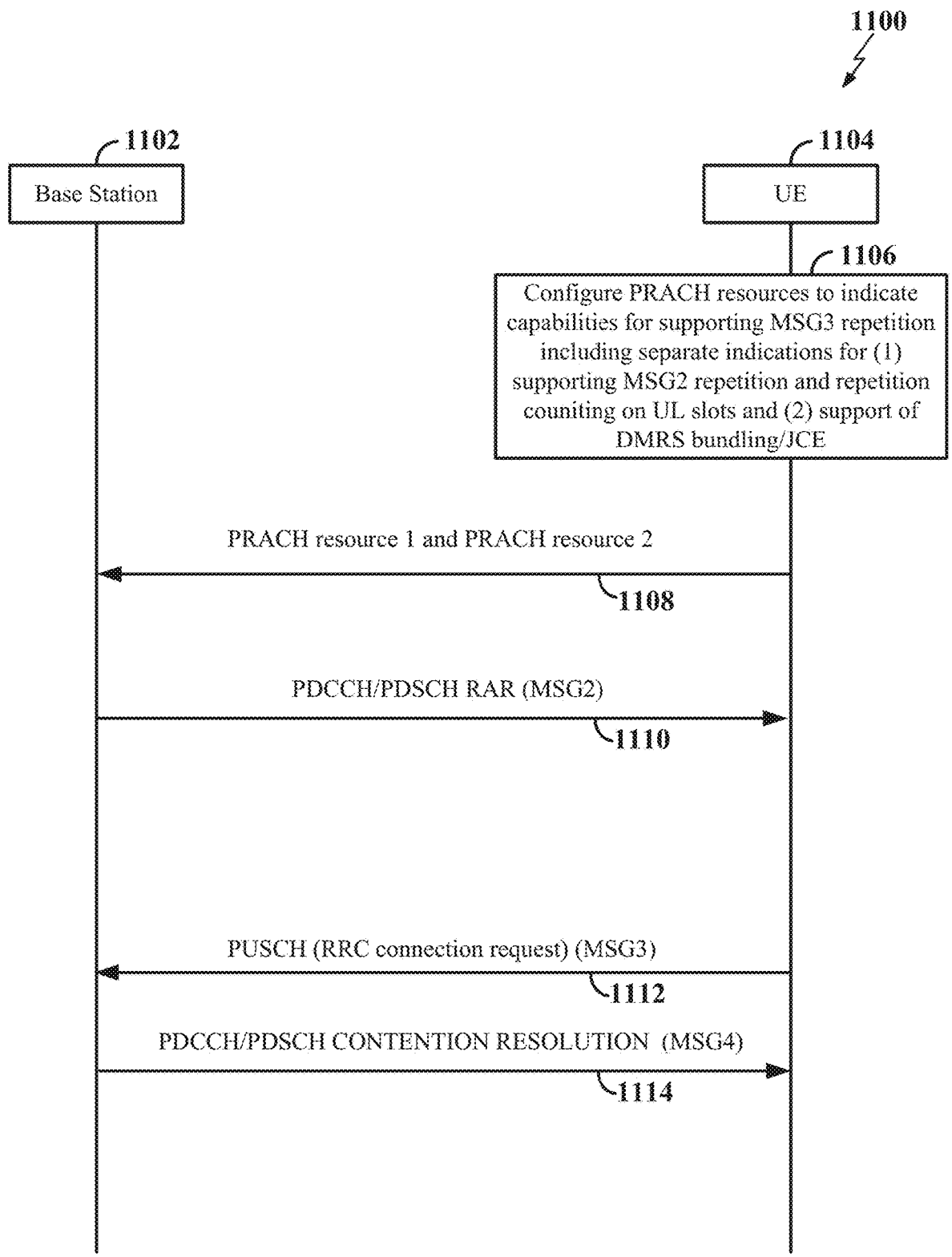
FIG. 11 illustrates another call flow diagram 1000 illustrating a UE indicating capabilities to a base station according to some aspects.

As an example of the second option, FIG. 11 illustrates a call flow diagram 1100 illustrating this option. As shown, the signaling illustrated in call flow diagram 1100 is between a base station or gNB 1102 and a UE 1104. The flow or process may include configuring the first and second PRACH resources as shown in block 1106. The UE 1104 then transmits the PRACH resources 1 and 2 1108 to the base station 1102. After the first and second PRACH resources are received in base station 1102, the base station 1102 is configured to decode both of the first and second PRACH resources, which in turn communicates the capability indications to the base station 1102. In particular, the base station 1102 will be aware that the UE 1104 is able to send Msg3 PUSCH repetition and is also capable of counting available UL slots for Msg3 PUSCH repetition from the first PRACH resource and that the UE 1104 is capable of DMRS bundling for the Msg3 repetition such the UE 1104 will maintain phase continuity across multiple PUSCH repetition transmissions.

The base station 1102 will send a RAR message (Msg2) 1110 on the PDCCH or PDSCH. In response, the UE 1104 will transmit a connection message (i.e., Msg3 on the PUSCH) to the base station 1102. In particular, if the UE 1104 has the capability for Msg3 PUSCH repetition, then repeated transmission of the Msg3 will be performed, including transmission. Finally, in the case of contention-based RACH, the base station 1102 will send Msg 4 for contention resolution via PDCCH or PDSCH resources as shown at 1114.

In a third option, the UE may be configured to indicate capability of Msg3 PUSCH repetition joint channel estimation using the DMRS uplink configuration for the initial Msg3 PUSCH transmission or through the DMRS transmission port. Concerning indication through the DMRS transmission port, it is noted here that if there are N number of transmission ports that may be configured for the PUSCH to carry the Msg3, some of the N number of ports could be dedicated for indicating JCE (i.e., that the UE has JCE capability and will use it when sending PUSCH, while the remainder of the N ports are for those UEs without JCE capability). Of further note here, from the network side, the network would perform blind detection of a transmission port hypotheses to determine whether the transmitting UE supports JCE or not.

In an example of the DMRS configuration, the joint channel estimation capability indication may be made by the DMRS sequence via one or more scrambling identities or identifiers (IDs) for UL DMRS scrambling initialization when the communication system utilizes a cyclic prefix OFDM (CP-OFDM) waveform (i.e., transformPrecoding-Disabled) or an nPUSCH-Identify parameter when discrete Fourier transform spread OFDM (DFT-s-OFDM) waveform is used in the communication system. An example of the DMRS uplink configuration parameters for CP-OFDM and DFT-s-OFDM waveforms is illustrated below in an exemplary UE configuration:

```
DMRS-UplinkConfig ::=         SEQUENCE {
    dmrs-Type                   ENUMERATED {type2}
    dmrs-AdditionalPosition     ENUMERATED {pos0,pos1,pos3}
    phaseTrackingRS             SetupRelease {PTRS-UplinkConfig}
    maxLength                   ENUMERATED {len2}
    tranformPrecodingDisabled   SEQUENCE {
        scramlbingID0               INTEGER (0..65535)
        scramblingID1               INTEGER (0..65535)
    ...,
    [[
        dmrs-Uplink-r16             ENUMERATED {enabled}
    ]]
    }
    transformPrecodingEnabled   SEQUENCE {
        nPUSCH-Identity             INTEGER (0..1007)
        sequenceGroupHopping        ENUMERATED {disabled}
        sequenceHopping             ENUMERATED {enabled}
```

Of further note, the DMRS resource for indication of the UE capability for joint channel estimation can be applied to the first Msg3 repetition or, in another aspect, to all configured repetitions of the initial Msg3 PUSCH transmission.

In an aspect, it is noted that the third option discussed above may be utilized with first option also discussed earlier. That is, the configuration of the PRACH resource is used to indicate that the UE supports Msg3 PUSCH repetition as well as repetition counting on available uplink slots, whereas indication that the UE supports joint channel estimation is made via either the DMRS configuration for the initial Msg3 PUSCH transmission or the DMRS transmission port. Turning back to FIG. 10, for example, this additional means of indication is illustrated with block 1016.

With regard to the options above, it is noted that the signaling of Msg3 repetition is indicated per UE (i.e., by or for each individual UE in a communication system) or per the frequency band (e.g., indicated for either FR1 or FR2). Furthermore, when a UE indicates the support of joint channel estimation for Msg3 PUSCH repetitions, it may only support some limited cases. For example, if the UE indicates support for JCE, the UE may only support back-to-back PUSCH repetition transmissions (i.e., zero gap in between transmissions). Yet further, if the UE indicates its capability of supporting JCE, the UE may, in addition to supporting back-to-back PUSCH transmissions, support non back-to-back PUSCH repetition transmissions when there is a non-zero gap in between transmissions but no other scheduled UL or DL transmissions occur in the gap. In yet other aspect, the capability indication may be signaled when the UE operates in frequency division duplex (FDD) mode in paired spectrum (e.g., a block of frequency spectrum in a lower frequency band and an associated block of frequency spectrum in an upper frequency band).

Figure 12:
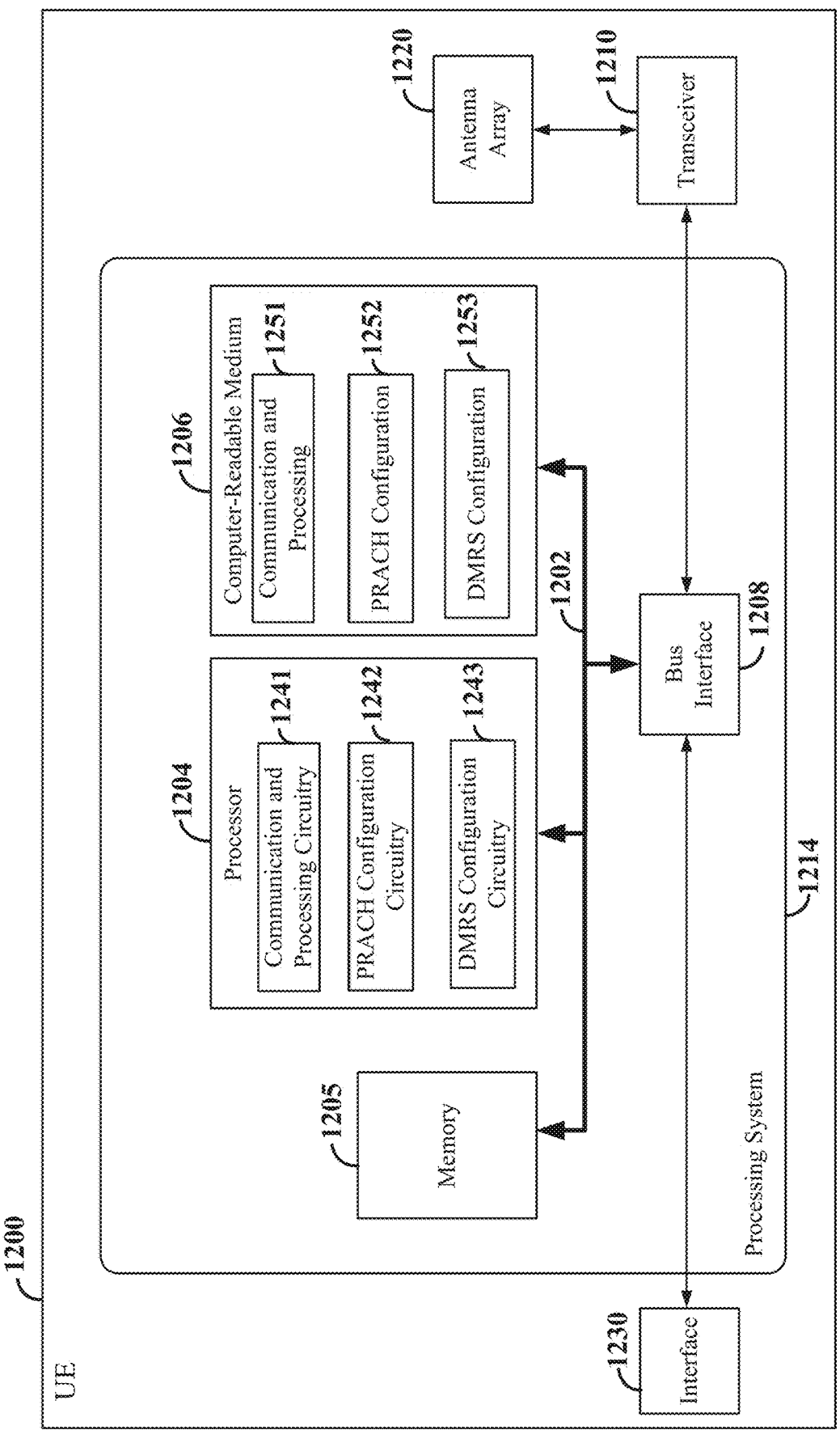
FIG. 12 is a block diagram illustrating an example of a hardware implementation for a user equipment (UE) employing a processing system according to some aspects.

FIG. 12 is a block diagram conceptually illustrating an example of a hardware implementation for a user equipment (UE) 1200 employing a processing system 1214 according to some aspects of the disclosure. In accordance with various aspects of the disclosure, an element, or any portion of an element, or any combination of elements may be implemented with a processing system 1214 that includes one or more processors 1204. In some implementations, the UE 1200 may correspond to any of the UEs or scheduled entities shown in any of FIG. 1, 2, 4, 10, or 11.

The UE 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes and procedures described below.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and between the bus 1202 and an interface 1230. The transceiver 1210 provides a communication interface or means for communicating with various other apparatus over a wireless transmission medium. In some examples, the wireless communication device may include two or more transceivers 1210, each configured to communicate with a respective network type (e.g., terrestrial or non-terrestrial). At least one interface 1230 (e.g., a network interface and/or a user interface) provides a communication interface or means of communicating with various other apparatus and devices (e.g., other devices housed within the same apparatus as the UE 1200 or an external apparatus) over an internal bus or via external transmission medium, such as an Ethernet cable.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1200 may be configured to perform any one or more of the operations described herein (e.g., as described above in conjunction with FIGS. 4-11 and as described below in conjunction with FIG. 13). In some aspects of the disclosure, the processor 1204, as utilized in the UE 1200, may include circuitry configured for various functions.

In one aspect, the processor 1204 may include a communication and processing circuitry 1241. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains. The communication and processing circuitry 1241 may further be configured to execute communication and processing software 1251 included on the computer-readable medium 1206 to implement one or more functions described herein.

The processor 1204 also includes PRACH configuration circuitry 1242 configured to configure PRACH resources for indicating Msg3 PUSCH repetition as discussed herein. The PRACH circuitry 1242 may include functionality for configuring the PRACH resources to indicate the UE is capable of supporting: (1) repeated transmission of a physical channel carrying a connection message, and (2) counting of available slots that are used for the repeated transmission of the physical channel as discussed herein. Moreover, the PRACH configuration circuitry 1242 may, in conjunction with communication and processing circuitry 1241 and/or the transceiver 1210, initiate or cause transmission of the PRACH using the configured PRACH resource to a network entity, such as a base station or gNB. The PRACH configuration circuitry 1242 may further be configured to execute PRACH configuration software 1252 included on the computer-readable medium 1206 to implement one or more functions described herein.

In further aspects, the PRACH configuration circuitry 1242 may configure the PRACH resource to include a first PRACH resource and a second PRACH resource, wherein the first PRACH resource is used to indicate that the UE is capable of supporting repeated transmission of the connection message, and counting of available slots that are used for repeated transmission of the uplink channel, and the second PRACH resource is used to indicate that the UE is capable of maintaining phase continuity across repetitions of a physical channel.

The processor 1204 also includes DMRS configuration circuitry 1243 configured to configure DMRS resources for indicating that the UE supports joint channel estimation, such as maintaining phase continuity across multiple PUSCH repetition transmissions as discussed herein. The DMRS configuration circuitry 1243 may include functionality for configuring a DMRS transmission port to indicate at the UE supports joint channel estimation according to other aspects. The DMRS configuration circuitry 1243 may further be configured to execute DMRS configuration circuitry 1253 included on the computer-readable medium 1206 to implement one or more functions described herein.

Figure 13:
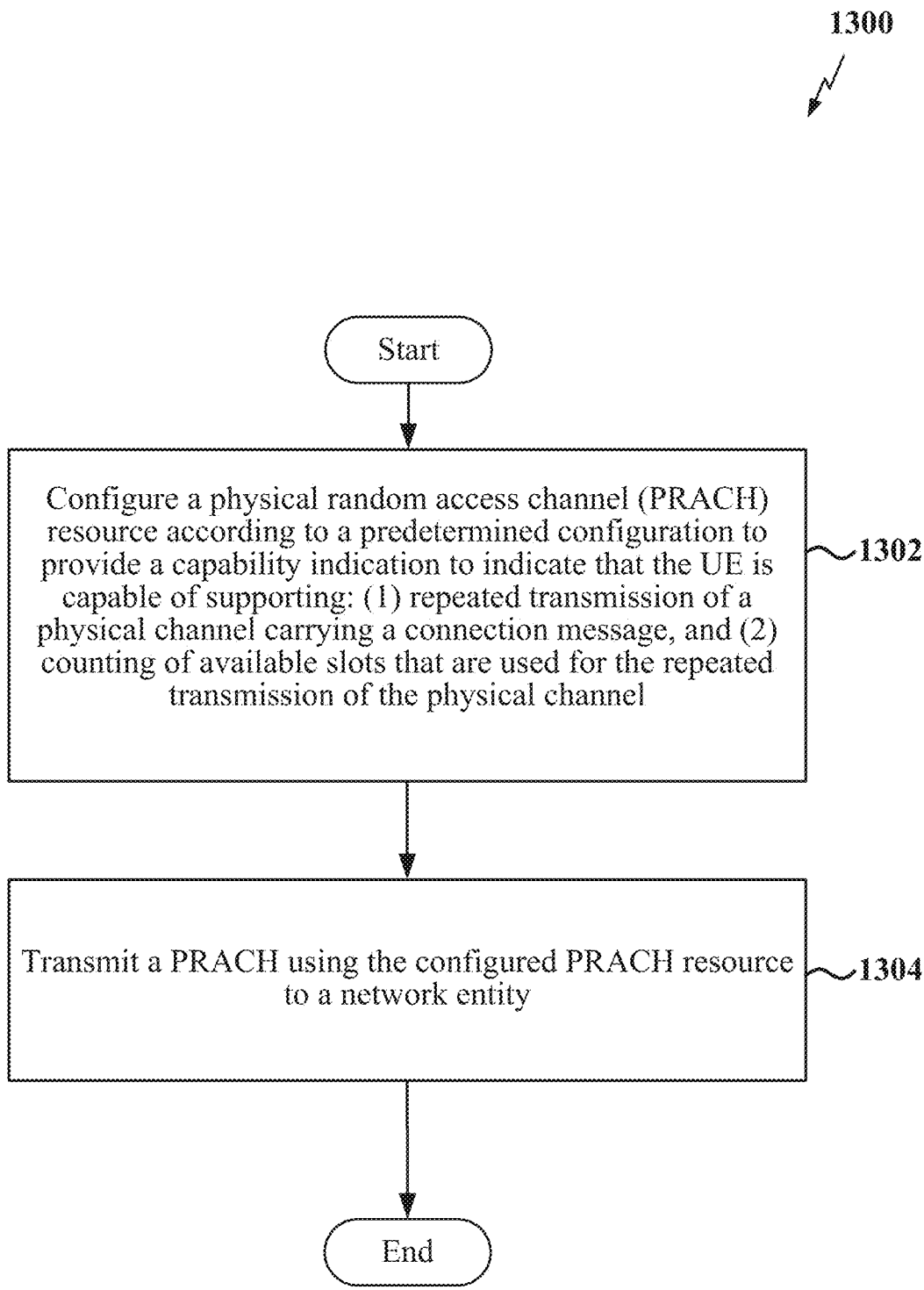
FIG. 13 is a flow chart illustrating an example of a method for communication in a UE according to some aspects.

FIG. 13 is a flow chart illustrating an example wireless communication method 1300 implemented by a UE according to some aspects of the disclosure. As described herein, some or all illustrated features may be omitted in a particular implementation within the scope of the present disclosure, and some illustrated features may not be required for implementation of all examples. In some examples, the method 1300 may be carried out by the UE 1200 illustrated in FIG. 12. In some examples, the method 1300 may be carried out by any suitable apparatus or means for carrying out the functions or algorithm described below.

At block 1302, the UE may configure a physical random access channel (PRACH) resource according to a predetermined configuration to indicate that the UE is capable of supporting: (1) repeated transmission of a physical channel carrying a connection message, and (2) counting of available slots that are used for the repeated transmission of the physical channel. In an aspect, the processes of block 1302 may implemented by a means for configuring the PRACH resource, which may be implemented by processor 1204, and PRACH configuration circuitry 1242, in a particular aspect, or equivalents thereof.

Further at block 1304 the UE may transmit a PRACH using the configured PRACH resource to a network entity. In aspects, it is noted that the PRACH resource comprises a PRACH preamble or a PRACH occasion comprising time and frequency resources. In an aspect, the processes of block 1304 may implemented by a means for PRACH transmission, which may be implemented by processor 1204, and PRACH configuration circuitry 1242, communication and processing circuitry 1241, and/or transceiver 1210, in particular aspects, or equivalents thereof.

Further, method 1300 may include that the configuring of the PRACH resource according to the predetermined configuration includes selecting a set of PRACH resources, wherein using the particular selected set of PRACH resources is configured to provide a capability indication to indicate that the UE is configured for repeated transmission of the physical channel carrying the connection message, and counting of available slots that may be used for transmission of the physical channel. In some other aspects, the configuring of the PRACH resource according to the predetermined configuration further indicates that the UE is capable of maintaining phase continuity across repeated transmissions of the physical channel carrying the connection message. In still other aspects, the connection message comprises a message 3 (Msg3) message, and includes one or more of a radio resource connection request, a scheduling request, or a buffer status.

Additionally, method 1300 may include each repetition in the repeated transmission of the PUSCH has a same symbol allocation in each slot in which the repetition is transmitted.

In still other aspects, method 1300 may include that the PRACH resource includes a first PRACH resource and a second PRACH resource, wherein the first PRACH resource is used to indicate that the UE is capable of supporting repeated transmission of the connection message, and counting of available slots that are used for repeated transmission of the uplink channel, and the second PRACH resource is used to indicate that the UE is capable of maintaining phase continuity across repetitions of a physical channel.

Method 1300 may also include that the capability indication is signaled per UE; e.g., each UE in a communication system signals its own capability indication. In other aspects, method 1300 may include that the capability indication is signaled per a frequency band of the transmission of the physical channel. In examples, the frequency band is FR1 or FR2.

Method 1300 may further include that the capability indication is applied to back-to-back repeated transmissions of the physical channel wherein no time gap exists between the repeated transmissions. Additionally, the capability indication is further applied to non-back-to-back repeated transmissions of the physical channel wherein a time gap occurs in between transmissions with no other scheduled uplink or downlink transmissions occurring in the time gap. Further, the capability indication is signaled when the UE operates in frequency division duplex (FDD) mode in paired spectrum.

In yet other aspects, method 1300 may include configuring a demodulation reference signal (DMRS) configuration or a DMRS transmission port for at least an initial transmission of the physical channel carrying the connection message that indicates that the UE is capable of maintaining phase continuity across repetitions of a physical channel; and transmitting at least the physical channel to the network entity based on the configuration. In an example, the DMRS configuration comprises a DMRS sequence with at least one scrambling identifier (ID) for a first type of waveform used in a communication system in which the UE is operable. Furthermore, the first type of waveform is a cyclic prefix orthogonal frequency division multiplexed (CP-OFDM) waveform and the DMRS configuration comprises a DMRS sequence with a parameter nPUSCH-Identity configured for particular values for a second type of waveform used in a communication system in which the UE is operable. Yet further, the second type of waveform is a discrete Fourier transform spread OFDM (DFT-s-OFDM) waveform, wherein the DMRS indication is applied to a first repeat transmission of the initial uplink channel transmission. Moreover, the DMRS indication is applied to a plurality of repeat transmissions of the initial uplink channel transmission. Also, the DMRS indication is applied to all repeat transmissions of the initial uplink channel transmission.

Figure 14:
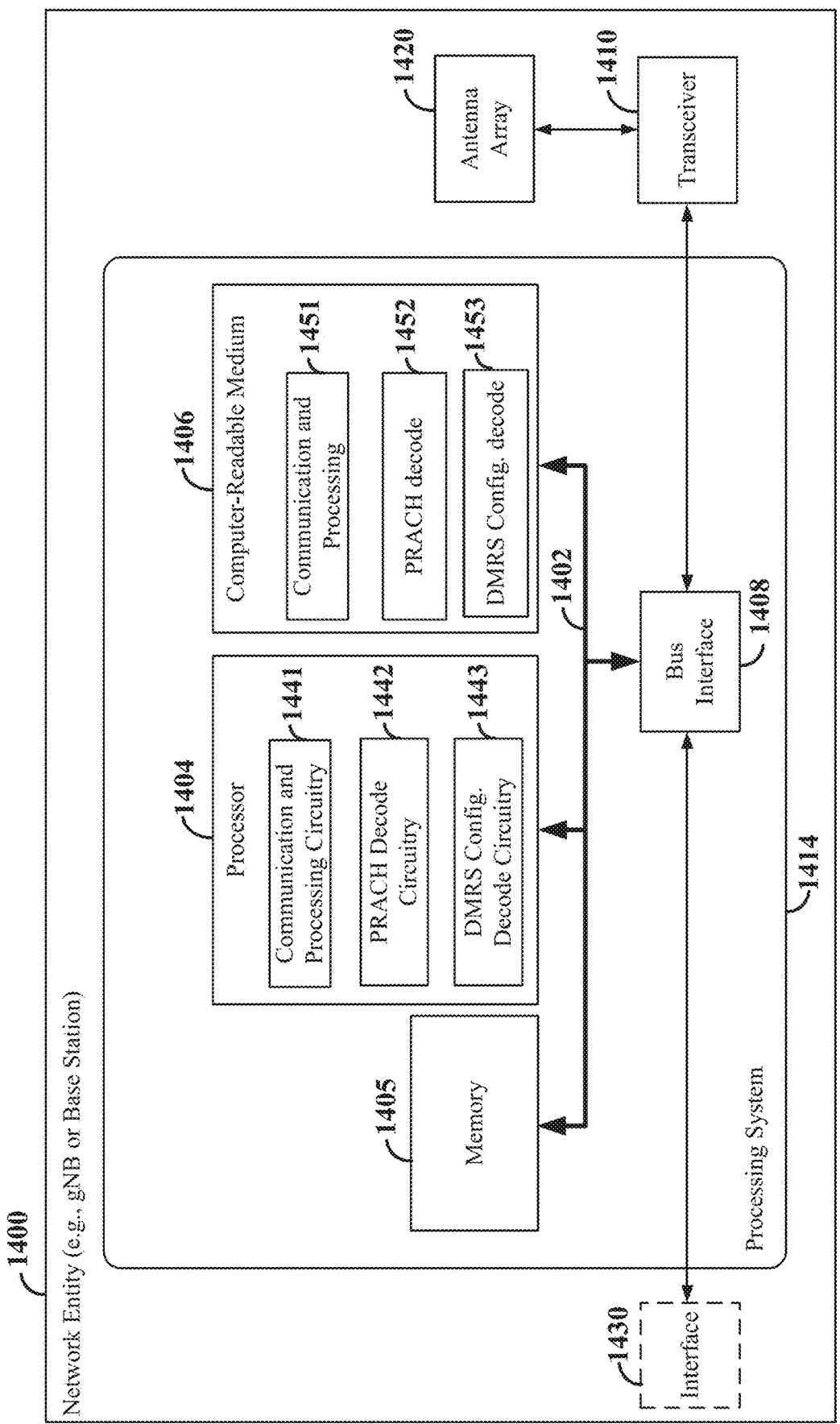
FIG. 14 is a block diagram illustrating an example of a hardware implementation for a network entity such as a base station employing a processing system according to some aspects.

FIG. 14 is a block diagram conceptually illustrating an example of a hardware implementation for a network node or entity 1400 employing a processing system 1414 according to some aspects of the disclosure. In accordance with various aspects of the disclosure, an element, or any portion of an element, or any combination of elements may be implemented with a processing system 1414 that includes one or more processors 1404. In some implementations, the network entity 1400 may correspond to any of the BSs (e.g., gNBs, eNBs, etc.) or scheduling entities shown in either of FIG. 1, 2, 4, 10 or 11. In further aspects, the network entity 1400 may be configured as a base station operable within an Open RAN (O-RAN) environment, wherein the base station (e.g., 1400) is disaggregated and includes distinct parts including a distributed unit (DU), a centralized unit (CU), and a radio unit (RU). In yet further aspects, the disclosed and illustrated processing portions of network entity 1400 may be implemented within the RU, DU and/or the CU or within portions of each.

The network entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1400 may be configured to perform any one or more of the functions described herein. That is, the processor 1404, as utilized in network entity 1400, may be used to implement any one or more of the processes and procedures described herein.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410 and between the bus 1402 and an interface 1430. The transceiver 1410 provides a communication interface or means for communicating with various other apparatus over a wireless transmission medium. In some examples, the wireless communication device may include two or more transceivers 1410, each configured to communicate with a respective network type (e.g., terrestrial or non-terrestrial). At least one interface 1430 (e.g., a network interface and/or a user interface) provides a communication interface or means of communicating with various other apparatus and devices (e.g., other devices housed within the same apparatus as the network entity 1400 or an external apparatus) over an internal bus or external transmission medium, such as an Ethernet cable.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The network entity 1400 may be configured to perform any one or more of the operations described herein (e.g., as described above in conjunction with FIGS. 4-11 and as described below in conjunction with FIG. 15). In some aspects of the disclosure, the processor 1404, as utilized in the network entity 1400, may include circuitry configured for various functions.

The processor 1404 may be configured to generate, schedule, and modify a resource assignment or grant of time-frequency resources (e.g., a set of one or more resource elements). For example, the processor 1404 may schedule time-frequency resources within a plurality of time division duplex (TDD) and/or frequency division duplex (FDD) subframes, slots, and/or mini-slots to carry user data traffic and/or control information to and/or from multiple UEs.

The processor 1404 may be configured to schedule resources for the transmission of downlink reference signals (e.g., SSBs or CSI-RSs) or DCI (or SRS triggering) on a plurality of downlink beams for a downlink beam sweep in accordance with a selected downlink beam sweep type and selected number of downlink reference signal resources indicated in a request for uplink beam refinement received from a UE. The processor 1404 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1404 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1404 may be configured to schedule PUSCH resources for the uplink beam refinement request in response to receiving a scheduling request from the UE.

The processor 1404 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 1404 may include communication and processing circuitry 1441. The communication and processing circuitry 1441 may include one or more hardware components that provide the physical structure that performs various processes related to wireless communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. In some examples, the communication and processing circuitry 1441 may include two or more transmit/receive chains. The communication and processing circuitry 1441 may further be configured to execute communication and processing software 1451 included on the computer-readable medium 1406 to implement one or more functions described herein.

In some other examples, the communication and processing circuitry 1441 may be configured to communicate higher layer information such as RRC configuration information to a UE. For example, the communication and processing circuitry 1441 may communicate RRC parameters to UEs that are used for determination of PRACH resources or DMRS configurations in accordance with the processes disclosed herein conjunction with FIGS. 4-11 and 13.

The processor 1404 may further include PRACH decode circuitry 1442 configured to process, receive, demodulate, interpret, and/or decode the PRACH resources configured and sent by the UE (e.g., UE 1200). This circuitry 1442 may be configured to decode and establish from the received PRACH resources that the transmitting UE supports Msg3 PUSCH repetition and repetition counting on available uplink slots. Additionally, in some aspects the PRACH decode circuitry 1442 may be configured to decode or interpret the PRACH resources to determine if the UE supports DMRS bundling/JCE. Furthermore, the PRACH decode circuitry 1442 may be configured to operate in accordance with the various processes disclosed herein in connection with FIGS. 4-11, 13, and/or 15. The PRACH decode circuitry 1442 may further be configured to execute PRACH decode software 1452 included on the computer-readable medium 1406 to implement one or more functions described herein.

In some further examples, the processor 1404 may further include DMRS configuration decode circuitry 1443, which is configured to decode or interpret the DMRS configuration of the UE to, in turn, determine whether the UE supports joint channel estimation for Msg3 PUSCH repetition. In other aspects, the DMRS configuration decode circuitry 1443 may be configured to decode and/or interpret whether the UE has Msg3 PUSCH repetition joint channel estimation capability based on the DMRS transmission port as discussed before. In yet further aspects, the DMRS configuration decode circuitry 1443 may determine or interpret whether the DMRS resource indication is to be applied to the first repetition of Msg3 or to all configured repetitions of an initial Msg3 PUSCH transmission. The DMRS configuration decode circuitry 1443 may further be configured to execute DMRS configuration decode software 1453 included on the computer-readable medium 1406 to implement one or more functions described herein.

Figure 15:
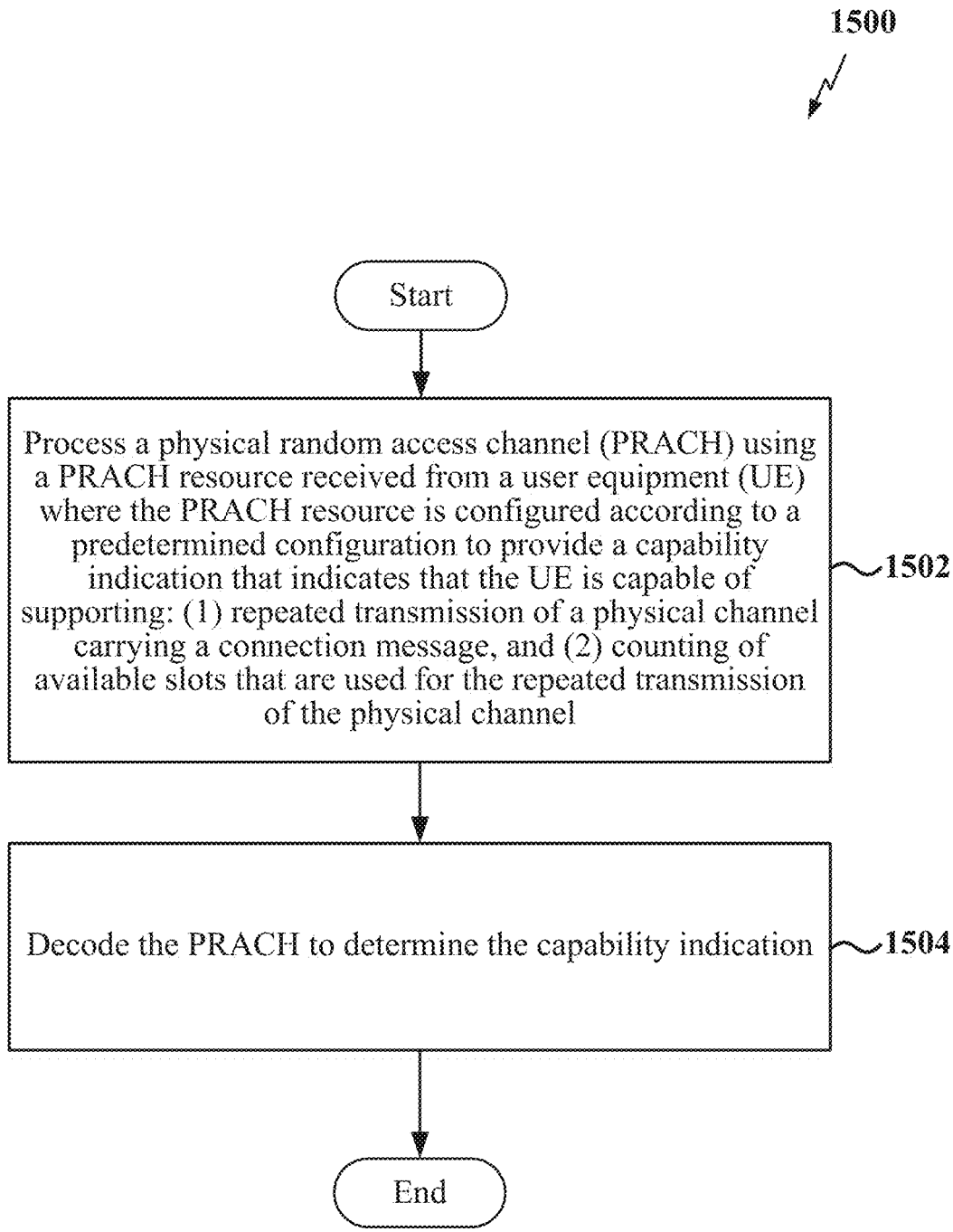
FIG. 15 is a flow chart illustrating a method for communication in a network entity according to some aspects.

FIG. 15 is a flow chart illustrating an example wireless communication method 1500 according to some aspects of the disclosure. As described herein, some or all illustrated features may be omitted in a particular implementation within the scope of the present disclosure, and some illustrated features may not be required for implementation of all examples. In some examples, the method 1500 may be carried out by the network entity 1400 (e.g., a gNB or base station including a base station operable in an O-RAN environment) illustrated in FIG. 14. In some examples, the method 1500 may be carried out by any suitable apparatus or means for carrying out the functions or algorithm described below.

At block 1502, the method 1500 includes processing a physical random access channel (PRACH) using a PRACH resource received from a UE where the PRACH resource is configured according to a predetermined configuration to provide a capability indication that indicates that the UE is capable of supporting: (1) repeated transmission of a physical channel carrying a connection message, and (2) counting of available slots that are used for the repeated transmission of the physical channel. In an aspect, the processes of block 1502 may implemented by a means for receiving the PRACH, which may be implemented by processor 1404, and communication and processing circuitry 1441 and transceiver 1410, in a particular aspect, or equivalents thereof.

Additionally, method 1500 includes decoding (or interpreting) the received PRACH as shown in block 1504. In an aspect, the processes of block 1504 may implemented by a means for decoding or interpreting the PRACH, which may be implemented by processor 1404, and PRACH decoding circuitry 1442, in a particular aspect, or equivalents thereof.

Of further note, the present disclosure may include the following further aspects of the present disclosure.

Aspect 1: A user equipment (UE), comprising a transceiver, a memory, and a processor communicatively coupled to the transceiver and the memory, wherein the processor is configured to: configure a physical random access channel (PRACH) resource according to a predetermined configuration to indicate that the UE is capable of supporting: repeated transmission of a physical channel carrying a connection message, and counting of available slots that are used for the repeated transmission of the physical channel; and transmit a PRACH using the configured PRACH resource to a network entity.

Aspect 2: The UE of aspect 1, wherein the PRACH resource comprises a PRACH preamble or a PRACH occasion comprising time and frequency resources, and the physical channel comprises a physical uplink shared channel (PUSCH).

Aspect 3: The UE of either aspect 1 or aspect 2, wherein the processor is further configured to: configure the PRACH resource according to the predetermined configuration by selecting a set of PRACH resources, wherein the selected set of PRACH resources is configured to provide indication that the UE is configured for repeated transmission of the physical channel carrying the connection message, and for counting of available slots that may be used for transmission of the physical channel.

Aspect 4: The UE of any of aspects 1 through 3, wherein the PRACH resource is further configured as a capability indication used to indicate that the UE is capable of maintaining phase continuity across repeated transmissions of the physical channel carrying the connection message.

Aspect 5: The UE of aspect 4, wherein the UE is configured to apply the capability indication to back-to-back repeated transmissions of the physical channel wherein no time gap exists between the repeated transmissions.

Aspect 6: The UE of aspects 4 or 5, wherein the UE is configured to further apply the capability indication to non-back-to-back repeated transmissions of the physical channel wherein a time gap occurs in between transmissions with no other scheduled uplink or downlink transmissions occurring in the time gap.

Aspect 7: The UE of any of aspects 4 through 6, wherein the UE is configured to signal the capability indication when the UE operates in frequency division duplex (FDD) mode in paired spectrum.

Aspect 8: The UE of any of aspects 1 through 7, wherein each repetition in the repeated transmission of the physical channel has a same symbol allocation in each slot in which the repetition is transmitted.

Aspect 9: The UE of any of aspects 1 through 8, further comprising: the PRACH resource comprising a first PRACH resource and a second PRACH resource, wherein the first PRACH resource is used to indicate that the UE is capable of supporting repeated transmission of the connection message, and counting of available slots that are used for repeated transmission of the uplink channel, and the second PRACH resource is used to indicate that the UE is capable of maintaining phase continuity across repetitions of the physical channel.

Aspect 10: The UE of any of aspects 1 through 9, wherein the processor is further configured to: configure a demodulation reference signal (DMRS) configuration or a DMRS transmission port for at least an initial transmission of the physical channel carrying the connection message that indicates that the UE is capable of maintaining phase continuity across repetitions of the physical channel; and transmit at least the physical channel to the network entity based on the configuration.

Aspect 11: The UE of aspect 10, wherein the DMRS configuration comprises: a first DMRS sequence with at least one scrambling identifier (ID) for a first type of waveform used in a communication system in which the UE is operable; and a second DMRS sequence with an identity parameter configured for particular values for a second type of waveform used in the communication system.

Aspect 12: A method for wireless communication in a user equipment (UE), comprising: configuring a physical random access channel (PRACH) resource according to a predetermined configuration to provide a capability indication to indicate that the UE is capable of supporting: repeated transmission of a physical channel carrying a connection message, and counting of available slots that are used for the repeated transmission of the physical channel; and transmitting a PRACH using the configured PRACH resource to a network entity.

Aspect 13: The method of aspect 12, wherein the PRACH resource comprises a PRACH preamble or a PRACH occasion comprising time and frequency resources.

Aspect 14: The method of either aspect 12 or 13, wherein the configuring the PRACH resource according to the predetermined configuration includes selecting a set of PRACH resources, wherein using the selected set of PRACH resources is configured to provide indication that the UE is configured for repeated transmission of the physical channel carrying the connection message, and for counting of available slots that may be used for transmission of the physical channel.

Aspect 15: The method of any of either aspect 12 or 13, wherein the configuring of the PRACH resource according to the predetermined configuration is further configured to provide the capability indication used to indicate that the UE is capable of maintaining phase continuity across repeated transmissions of the physical channel carrying the connection message.

Aspect 16: The method of any of aspects 12 through 15, wherein the physical channel comprises a physical uplink shared channel (PUSCH).

Aspect 17: The method of any of aspects 12 through 16, wherein each repetition in the repeated transmission of the PUSCH has a same symbol allocation in each slot in which the repetition is transmitted.

Aspect 18: The method of any of aspects 12 through 17, wherein the PRACH resource further comprises: a first PRACH resource configured to indicate that the UE is capable of supporting repeated transmission of the connection message, and counting of available slots that are used for repeated transmission of the uplink channel; and a second PRACH resource configured to indicate that the UE is capable of maintaining phase continuity across repetitions of a physical channel.

Aspect 19: The method of any of aspects 12 through 18, wherein the capability indication is signaled per UE, by each UE in a wireless communication system, or for each frequency band of the transmission of the physical channel.

Aspect 20: The method of any of aspects 12 through 19, wherein the capability indication is applied to back-to-back repeated transmissions of the physical channel wherein no time gap exists between the repeated transmissions.

Aspect 21: The method of any of aspects 12 through 20, wherein the capability indication is further applied to non-back-to-back repeated transmissions of the physical channel wherein a time gap occurs in between transmissions with no other scheduled uplink or downlink transmissions occurring in the time gap.

Aspect 22: The method of any of aspects 12 through 21, further comprising: configuring a demodulation reference signal (DMRS) configuration or a DMRS transmission port for at least an initial uplink channel transmission of the physical channel carrying the connection message that indicates that the UE is capable of maintaining phase continuity across repetitions of the physical channel; and transmitting at least the physical channel to the network entity based on the configuration.

Aspect 23: The method of aspect 22, wherein the DMRS configuration comprises: a first DMRS sequence with at least one scrambling identifier (ID) for a first type of waveform used in a communication system in which the UE is operable; and a second DMRS sequence with an identity parameter configured for particular values for a second type of waveform used in the communication system.

Aspect 24: The method of either of aspects 22 or 23, wherein the DMRS indication is applied to one of: a first repeat transmission of the initial uplink channel transmission; a plurality of repeat transmissions of the initial uplink channel transmission; or all repeat transmissions of the initial uplink channel transmission.

Aspect 25: The method of any of aspects 22 through 24, further comprising: selectively applying the configured DMRS or DMRS port for occasions where repeated transmission of the connection message comprises back-to-back repeated transmissions of the connection message wherein no time gap exists between the repeated transmissions.

Aspect 26: The method of any of aspects 22 through 25, further comprising: selectively applying the configured DMRS or DMRS port for occasions where repeated transmission of the connection message comprises non-back-to-back repeated transmissions of the connection message wherein a time gap occurs in between transmissions with no other scheduled uplink or downlink transmissions occur in the time gap.

Aspect 27: A base station, comprising: a processor configured to: process a physical random access channel (PRACH) using a PRACH resource from a user equipment (UE) where the PRACH resource is configured according to a predetermined configuration to provide a capability indication that indicates that the UE is capable of supporting: repeated transmission of a physical channel carrying a connection message, and counting of available slots that are used for the repeated transmission of the physical channel; and decode the PRACH to determine the capability indication; wherein the PRACH resource comprises a PRACH preamble or a PRACH occasion comprising time and frequency resources and the connection message comprises a message 3 (Msg3) message including one or more of a radio resource connection request, a scheduling request, or a buffer status.

Aspect 28: The base station of aspect 27, wherein the processor is further configured to: process a demodulation reference signal (DMRS) configuration or a DMRS transmission port for at least an initial transmission of the physical channel carrying the connection message that indicates that the UE is capable of maintaining phase continuity across repetitions of the physical channel; and decode the DMRS configuration or interpreting the DMRS transmission port to determine that the UE is capable of maintaining phase continuity across repetitions of the physical channel.

Aspect 29: A method for wireless communications in a base station comprising: processing a physical random access channel (PRACH) using a PRACH resource from a user equipment (UE) where the PRACH resource is configured according to a predetermined configuration to provide a capability indication that indicates that the UE is capable of supporting: repeated transmission of a physical channel carrying a connection message, and counting of available slots that are used for the repeated transmission of the physical channel; and decoding the PRACH to determine the capability indication; wherein the PRACH resource comprises a PRACH preamble or a PRACH occasion comprising time and frequency resources and the connection message comprises a message 3 (Msg3) message including one or more of a radio resource connection request, a scheduling request, or a buffer status.

Aspect 30: The method of aspect 29, further comprising: processing a demodulation reference signal (DMRS) configuration or a DMRS transmission port for at least an initial transmission of the physical channel carrying the connection message that indicates that the UE is capable of maintaining phase continuity across repetitions of the physical channel; and decoding the DMRS configuration or interpreting the DMRS transmission port to determine that the UE is capable of maintaining phase continuity across repetitions of the physical channel.

Aspect 31: An apparatus configured for wireless communication comprising at least one means for performing a method of any one of aspects 12 through 26 or aspects 29 and 30.

Aspect 32: A non-transitory computer-readable medium storing computer-executable code, comprising code for causing an apparatus to perform a method of any one of aspects 12 through 26 or aspects 29 and 30.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) standards IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
   one or more transceivers;
   one or more memories; and
   one or more processors communicatively coupled to the one or more transceivers and the one or more memories, wherein the one or more processors are individually or collectively configured to:
   configure a physical random access channel (PRACH) resource according to a predetermined configuration to indicate that the UE is capable of supporting:
      repeated transmission of a physical channel carrying a connection message, and
      counting of available slots that are used for the repeated transmission of the physical channel; and
   transmit a PRACH using the configured PRACH resource to a network entity,
   wherein the PRACH resource is further configured as a capability indication used to indicate that the UE is capable of maintaining phase continuity across repeated transmissions of the physical channel carrying the connection message.

2. The UE of claim 1, wherein the PRACH resource comprises a PRACH preamble or a PRACH occasion comprising time and frequency resources, and the physical channel comprises a physical uplink shared channel (PUSCH).

3. The UE of claim 1, wherein the processor is further configured to:
   configure the PRACH resource according to the predetermined configuration by selecting a set of PRACH resources, wherein the selected set of PRACH resources is configured to provide indication that the UE is configured for repeated transmission of the physical channel carrying the connection message, and for counting of available slots that may be used for transmission of the physical channel.

4. The UE of claim 1, wherein the UE is configured to apply the capability indication to back-to-back repeated transmissions of the physical channel wherein no time gap exists between the repeated transmissions.

5. The UE of claim 4, wherein the UE is configured to further apply the capability indication to non-back-to-back repeated transmissions of the physical channel wherein a time gap occurs in between transmissions with no other scheduled uplink or downlink transmissions occurring in the time gap.

6. The UE of claim 4, wherein the UE is configured to signal the capability indication when the UE operates in frequency division duplex (FDD) mode in paired spectrum.

7. The UE of claim 1, wherein each repetition in the repeated transmission of the physical channel has a same symbol allocation in each slot in which the repetition is transmitted.

8. The UE of claim 1, further comprising:
the PRACH resource comprising a first PRACH resource and a second PRACH resource, wherein the first PRACH resource is used to indicate that the UE is capable of supporting repeated transmission of the connection message, and counting of available slots that are used for repeated transmission of the uplink channel, and the second PRACH resource is used to indicate that the UE is capable of maintaining phase continuity across repetitions of the physical channel.

9. The UE of claim 1, wherein the processor is further configured to:
configure a demodulation reference signal (DMRS) configuration or a DMRS transmission port for at least an initial transmission of the physical channel carrying the connection message that indicates that the UE is capable of maintaining phase continuity across repetitions of the physical channel; and
transmit at least the physical channel to the network entity based on the configuration.

10. The UE of claim 9, wherein the DMRS configuration comprises:
a first DMRS sequence with at least one scrambling identifier (ID) for a first type of waveform used in a communication system in which the UE is operable; and
a second DMRS sequence with an identity parameter configured for particular values for a second type of waveform used in the communication system.

11. A method for wireless communication in a user equipment (UE), comprising:
configuring a physical random access channel (PRACH) resource according to a predetermined configuration to provide a capability indication to indicate that the UE is capable of supporting:
repeated transmission of a physical channel carrying a connection message, and
counting of available slots that are used for the repeated transmission of the physical channel; and
transmitting a PRACH using the configured PRACH resource to a network entity,
wherein the PRACH resource is further configured as a capability indication used to indicate that the UE is capable of maintaining phase continuity across repeated transmissions of the physical channel carrying the connection message.

12. The method of claim 11, wherein the PRACH resource comprises a PRACH preamble or a PRACH occasion comprising time and frequency resources.

13. The method of claim 11, wherein the configuring the PRACH resource according to the predetermined configuration includes selecting a set of PRACH resources, wherein using the selected set of PRACH resources is configured to provide indication that the UE is configured for repeated transmission of the physical channel carrying the connection message, and for counting of available slots that may be used for transmission of the physical channel.

14. The method of claim 11, wherein the physical channel comprises a physical uplink shared channel (PUSCH).

15. The method of claim 14, wherein each repetition in the repeated transmission of the PUSCH has a same symbol allocation in each slot in which the repetition is transmitted.

16. The method of claim 11, wherein the PRACH resource further comprises:
a first PRACH resource configured to indicate that the UE is capable of supporting repeated transmission of the connection message, and counting of available slots that are used for repeated transmission of the uplink channel; and
a second PRACH resource configured to indicate that the UE is capable of maintaining phase continuity across repetitions of a physical channel.

17. The method of claim 11, wherein the capability indication is signaled per UE, by each UE in a wireless communication system, or for each frequency band of the transmission of the physical channel.

18. The method of claim 11, wherein the capability indication is applied to back-to-back repeated transmissions of the physical channel wherein no time gap exists between the repeated transmissions.

19. The method of claim 18, wherein the capability indication is further applied to non-back-to-back repeated transmissions of the physical channel wherein a time gap occurs in between transmissions with no other scheduled uplink or downlink transmissions occurring in the time gap.

20. The method of claim 11, further comprising:
configuring a demodulation reference signal (DMRS) configuration or a DMRS transmission port for at least an initial uplink channel transmission of the physical channel carrying the connection message that indicates that the UE is capable of maintaining phase continuity across repetitions of the physical channel; and
transmitting at least the physical channel to the network entity based on the configuration.

21. The method of claim 20, wherein the DMRS configuration comprises:
a first DMRS sequence with at least one scrambling identifier (ID) for a first type of waveform used in a communication system in which the UE is operable; and
a second DMRS sequence with an identity parameter configured for particular values for a second type of waveform used in the communication system.

22. The method of claim 20, wherein the DMRS indication is applied to one of:
a first repeat transmission of the initial uplink channel transmission;
a plurality of repeat transmissions of the initial uplink channel transmission; or
all repeat transmissions of the initial uplink channel transmission.

23. The method of claim 20, further comprising:
selectively applying the configured DMRS or DMRS port for occasions where repeated transmission of the connection message comprises back-to-back repeated transmissions of the connection message wherein no time gap exists between the repeated transmissions.

24. The method of claim 20, further comprising:
selectively applying the configured DMRS or DMRS port for occasions where repeated transmission of the connection message comprises non-back-to-back repeated transmissions of the connection message wherein a time gap occurs in between transmissions with no other scheduled uplink or downlink transmissions occur in the time gap.

25. A network entity, comprising:
one or more processors individually or collectively configured to:
process a physical random access channel (PRACH) using a PRACH resource from a user equipment (UE) where the PRACH resource is configured according to a predetermined configuration to provide a capability indication that indicates that the UE is capable of supporting:
  (1) repeated transmission of a physical channel carrying a connection message, and
  (2) counting of available slots that are used for the repeated transmission of the physical channel; and
decode the PRACH to determine the capability indication;
wherein the PRACH resource comprises a PRACH preamble or a PRACH occasion comprising time and frequency resources and the connection message comprises a message 3 (Msg3) message including one or more of a radio resource connection request, a scheduling request, or a buffer status, and
wherein the PRACH resource is further used to indicate that the UE is capable of maintaining phase continuity across repeated transmissions of the physical channel carrying the connection message.

26. The network entity of claim 25, wherein the processor is further configured to:
process a demodulation reference signal (DMRS) configuration or a DMRS transmission port for at least an initial transmission of the physical channel carrying the connection message that indicates that the UE is capable of maintaining phase continuity across repetitions of the physical channel; and
decode the DMRS configuration or interpreting the DMRS transmission port to determine that the UE is capable of maintaining phase continuity across repetitions of the physical channel.

27. A method for wireless communications in a network entity comprising:
processing a physical random access channel (PRACH) using a PRACH resource from a user equipment (UE) where the PRACH resource is configured according to a predetermined configuration to provide a capability indication that indicates that the UE is capable of supporting:
  (1) repeated transmission of a physical channel carrying a connection message, and
  (2) counting of available slots that are used for the repeated transmission of the physical channel; and
decoding the PRACH to determine the capability indication;
wherein the PRACH resource comprises a PRACH preamble or a PRACH occasion comprising time and frequency resources and the connection message comprises a message 3 (Msg3) message including one or more of a radio resource connection request, a scheduling request, or a buffer status, and
wherein the PRACH resource is further used to indicate that the UE is capable of maintaining phase continuity across repeated transmissions of the physical channel carrying the connection message.

28. The method of claim 27, further comprising:
processing a demodulation reference signal (DMRS) configuration or a DMRS transmission port for at least an initial transmission of the physical channel carrying the connection message that indicates that the UE is capable of maintaining phase continuity across repetitions of the physical channel; and
decoding the DMRS configuration or interpreting the DMRS transmission port to determine that the UE is capable of maintaining phase continuity across repetitions of the physical channel.

* * * * *